United States Patent
Frydman et al.

(10) Patent No.: US 9,742,862 B2
(45) Date of Patent: Aug. 22, 2017

(54) METHODS CIRCUITS DEVICES SYSTEMS AND ASSOCIATED MACHINE EXECUTABLE CODE FOR EFFICIENT DELIVERY OF MULTI-UNICAST COMMUNICATION TRAFFIC

(71) Applicant: SAGUNA NETWORKS LTD., Yokneam Illit (IL)

(72) Inventors: Daniel Nathan Frydman, Haifa (IL); Lior Fite, Zurit (IL)

(73) Assignee: SAGUNA NETWORKS LTD., Yokneam Illit (IL)

( * ) Notice: Subject to any disclaimer, the term of this patent is extended or adjusted under 35 U.S.C. 154(b) by 6 days.

(21) Appl. No.: 14/745,439

(22) Filed: Jun. 21, 2015

(65) Prior Publication Data
US 2015/0334202 A1 Nov. 19, 2015

Related U.S. Application Data

(63) Continuation-in-part of application No. 14/455,955, filed on Aug. 11, 2014, which is a continuation of application No. 13/736,098, filed on Jan. 8, 2013, now Pat. No. 8,804,725, which is a continuation of application No. 12/561,324, filed on Sep. 17, 2009, now Pat. No. 8,369,328.

(60) Provisional application No. 61/225,269, filed on Jul. 14, 2009.

(51) Int. Cl.
| H04L 12/28 | (2006.01) |
| H04L 12/56 | (2006.01) |
| H04L 29/08 | (2006.01) |
| H04L 12/18 | (2006.01) |
| H04L 12/761 | (2013.01) |
| H04L 29/06 | (2006.01) |
| H04W 4/18 | (2009.01) |

(52) U.S. Cl.
CPC ........ *H04L 67/2842* (2013.01); *H04L 12/189* (2013.01); *H04L 12/1827* (2013.01); *H04L 12/1854* (2013.01); *H04L 45/16* (2013.01); *H04L 65/1069* (2013.01); *H04L 65/4076* (2013.01); *H04L 65/4084* (2013.01); *H04L 67/02* (2013.01); *H04W 4/18* (2013.01)

(58) Field of Classification Search
CPC ... H04L 67/2842; H04L 12/189; H04L 45/16; H04L 45/24; H04L 12/1854; H04L 12/1827; H04L 67/02; H04L 65/4069
USPC ................ 370/352, 353, 401, 390
See application file for complete search history.

(56) References Cited

U.S. PATENT DOCUMENTS

| 8,369,328 B2 * | 2/2013 | Frydman | H04L 12/1827 370/390 |
| 8,804,725 B2 * | 8/2014 | Frydman | H04L 12/1827 370/390 |
| 2002/0124262 A1 * | 9/2002 | Basso | H04N 7/17336 725/109 |

(Continued)

*Primary Examiner* — Chuong T Ho
(74) *Attorney, Agent, or Firm* — Vladimir Sherman; Professional Patent Solutions

(57) ABSTRACT

Disclosed are systems and methods for the delivery of multi-unicast communication traffic. A multimedia router is adapted to analyze and identify contents which it handles and one or more access nodes are adapted to receive one or more of the identified contents, cache contents based on said identification; and use cached contents as substitutes for redundant traffic, received by the same access node.

18 Claims, 29 Drawing Sheets

(56) References Cited

U.S. PATENT DOCUMENTS

| | | | |
|---|---|---|---|
| 2006/0268697 A1* | 11/2006 | Oz | H04L 12/1836 370/229 |
| 2009/0171990 A1* | 7/2009 | Naef, III | G06Q 10/06 |
| 2010/0046401 A1* | 2/2010 | Wright | H04L 12/5695 370/260 |
| 2011/0013631 A1* | 1/2011 | Frydman | H04L 12/1827 370/390 |
| 2013/0191488 A1* | 7/2013 | Frydman | H04L 12/1827 709/213 |
| 2014/0348165 A1* | 11/2014 | Frydman | H04L 12/1827 370/390 |

* cited by examiner

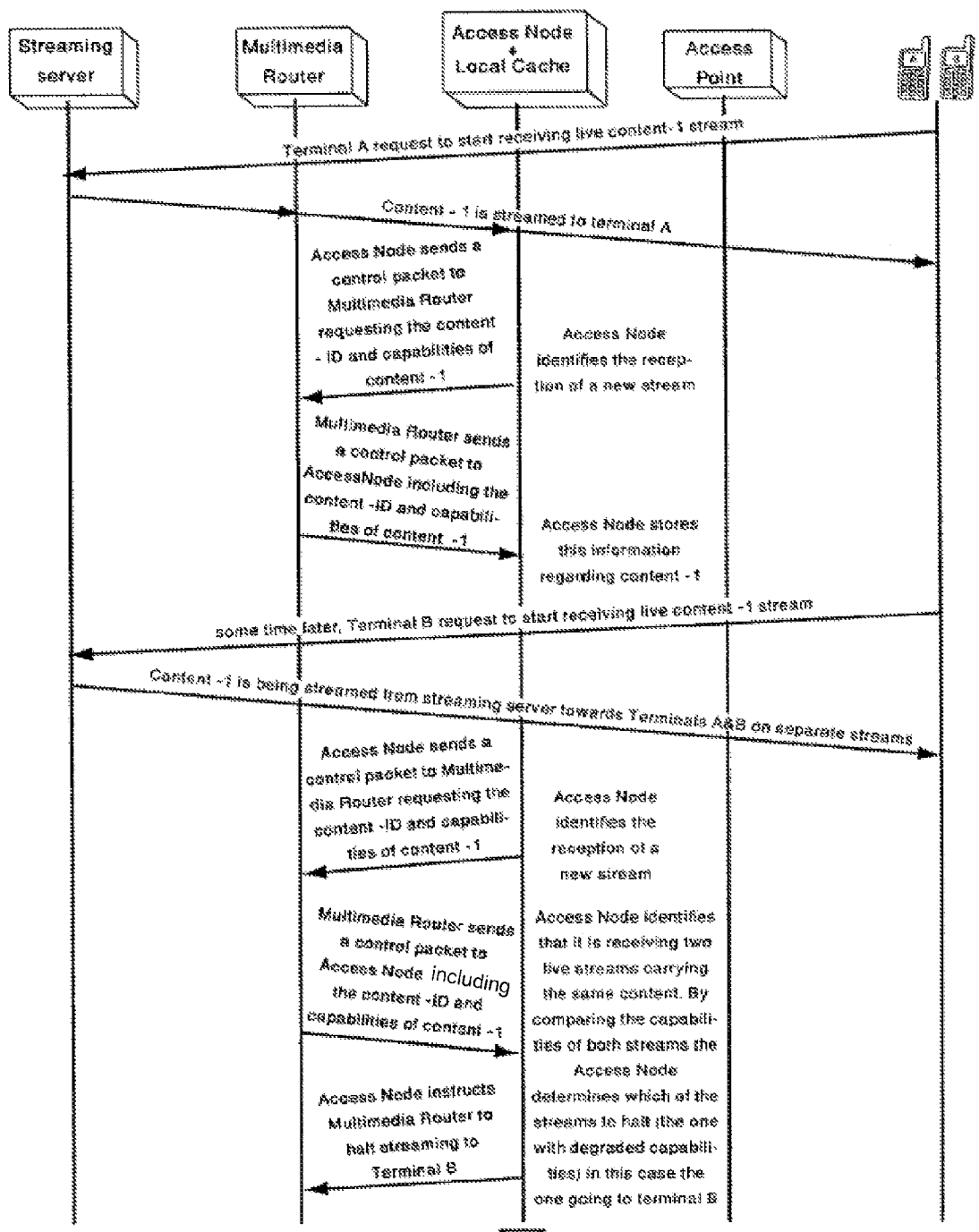
FIG. 4A1

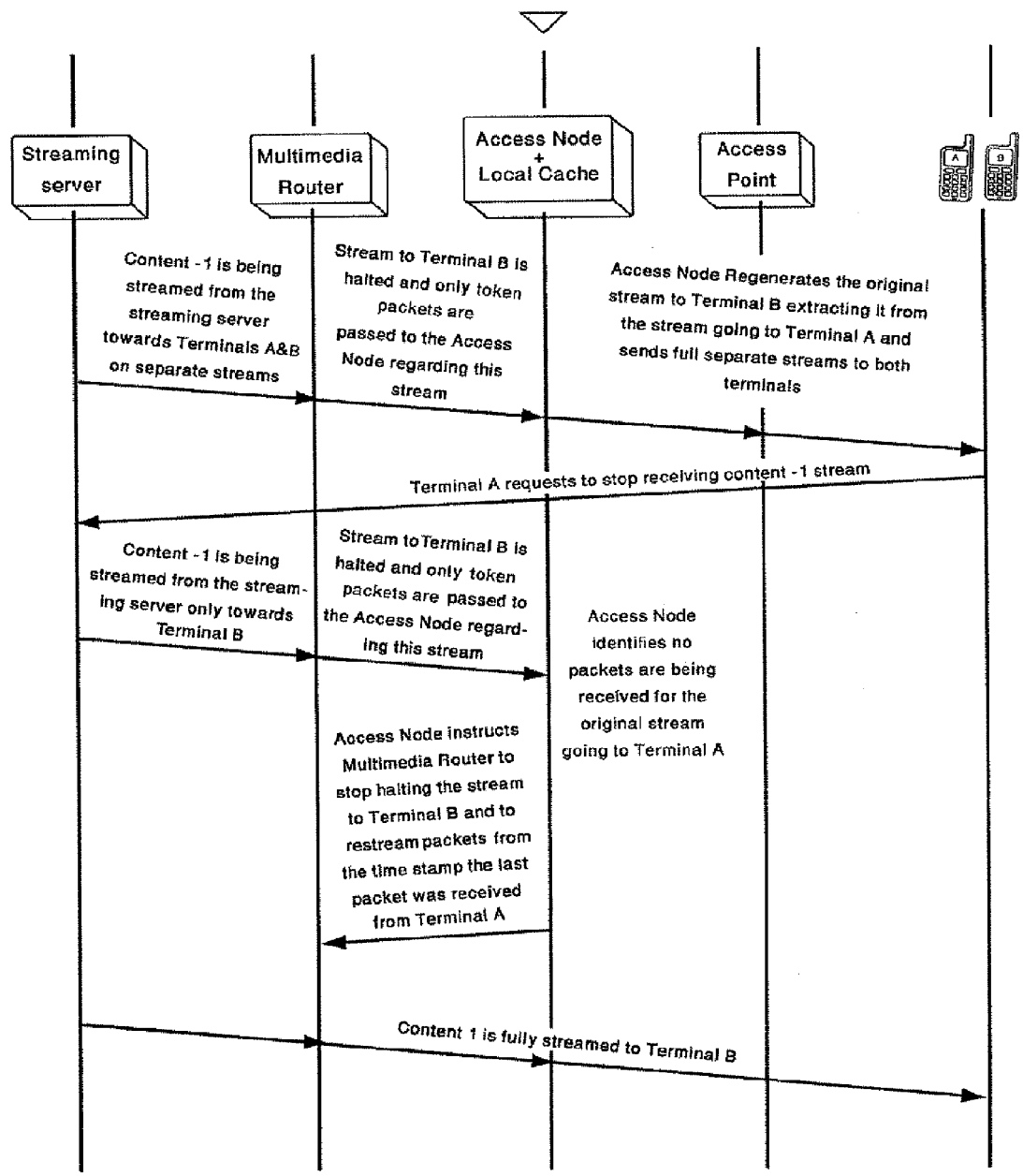
FIG. 4A2

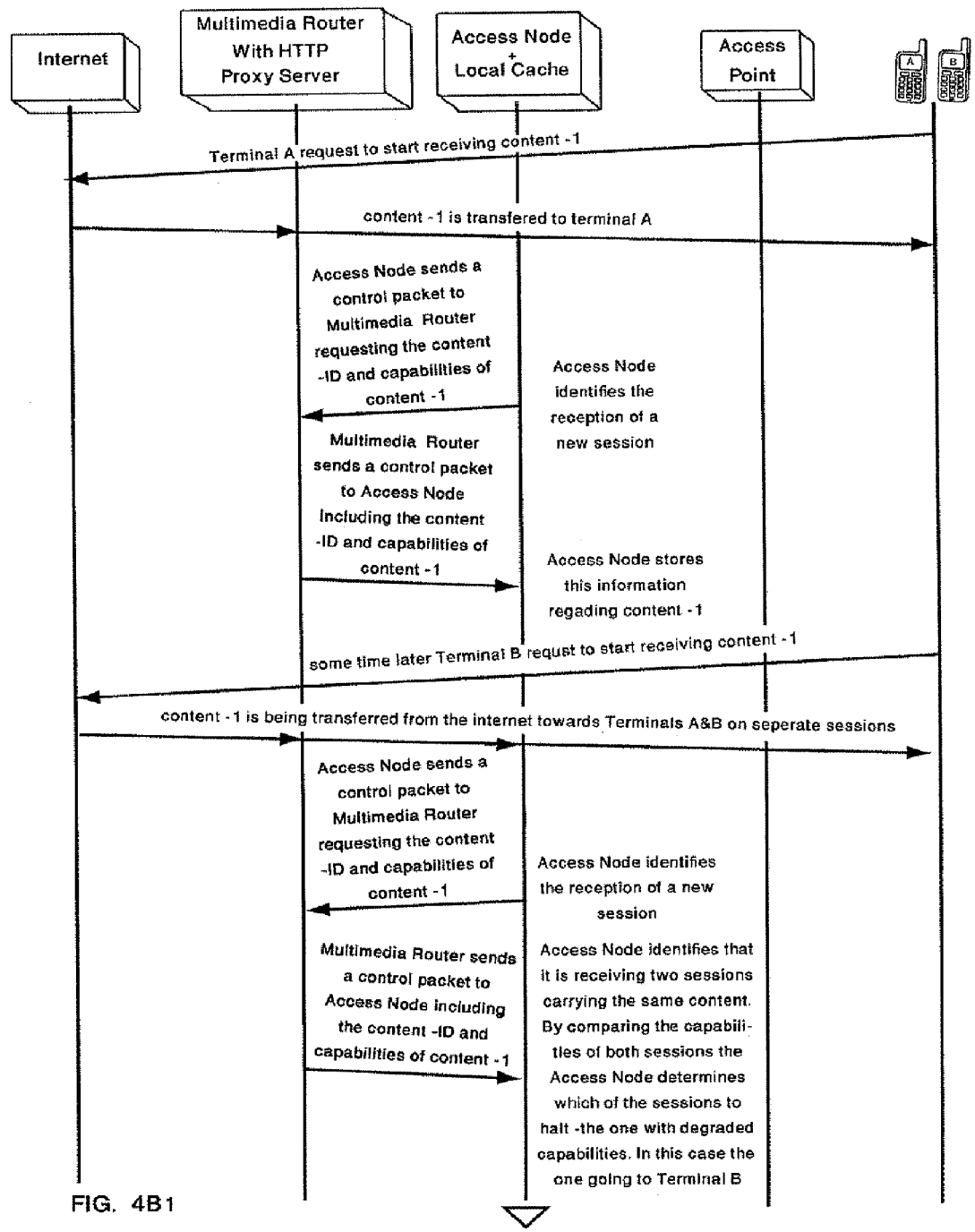
FIG. 4B1

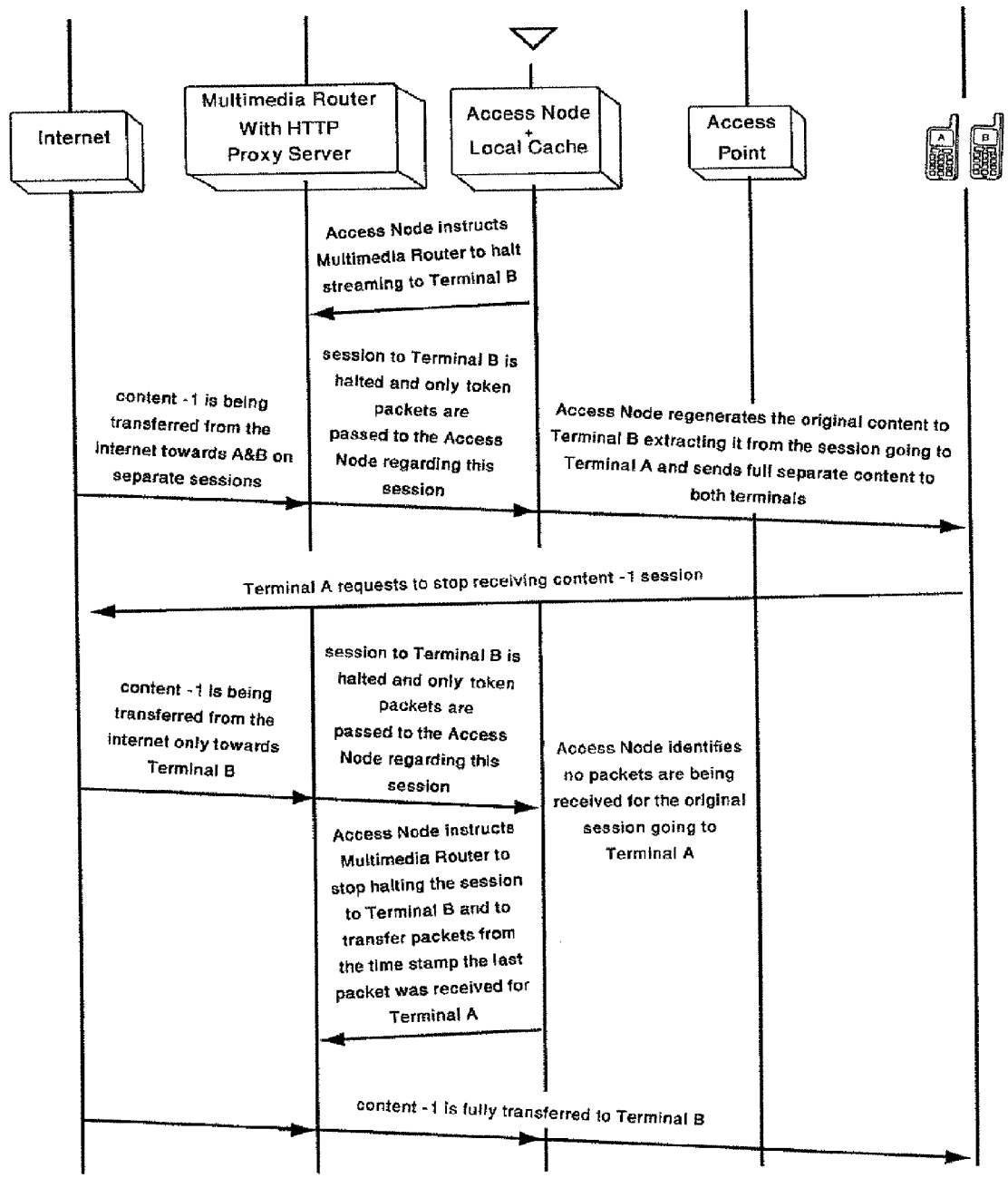
FIG. 4B2

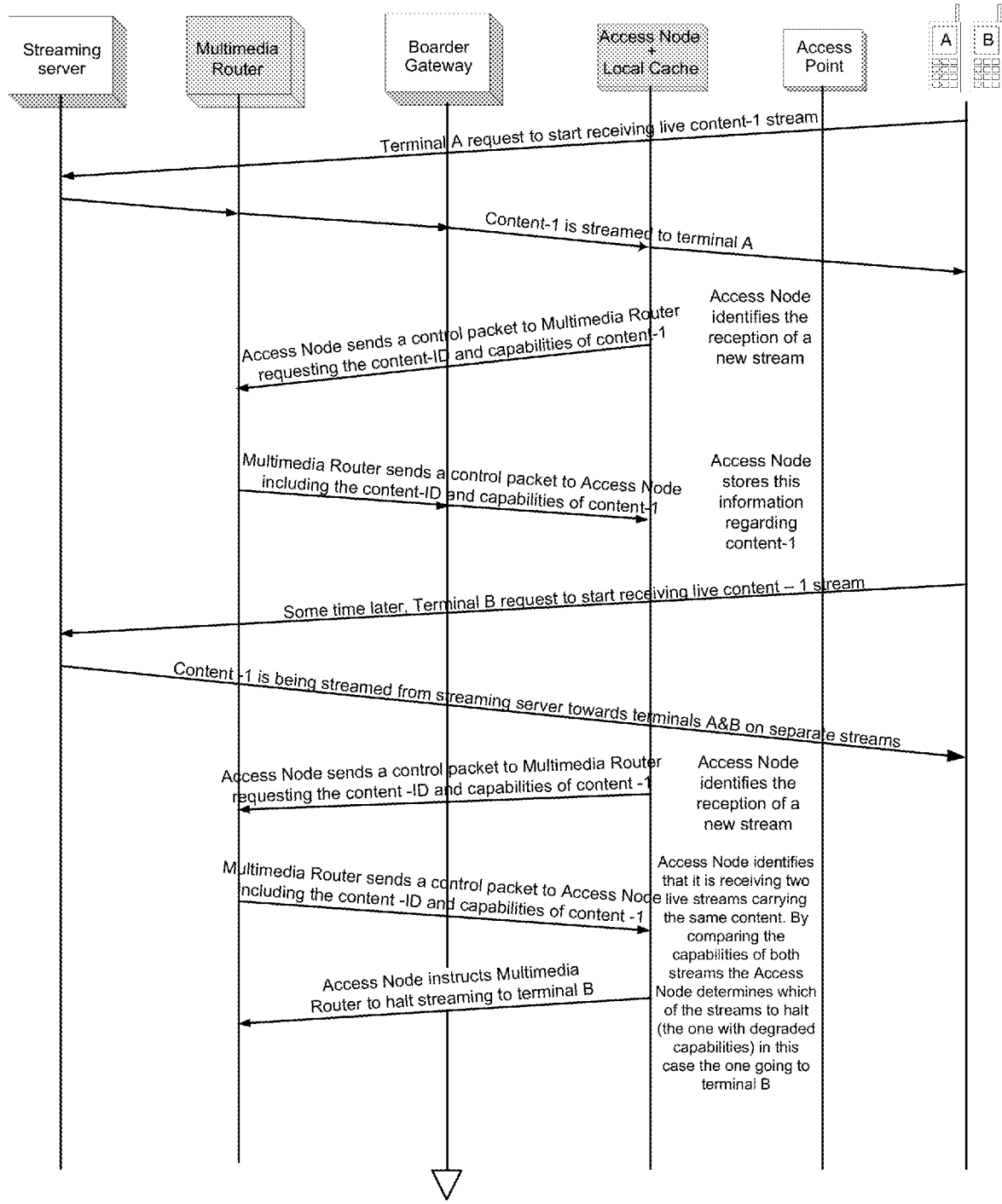
FIG. 4C1

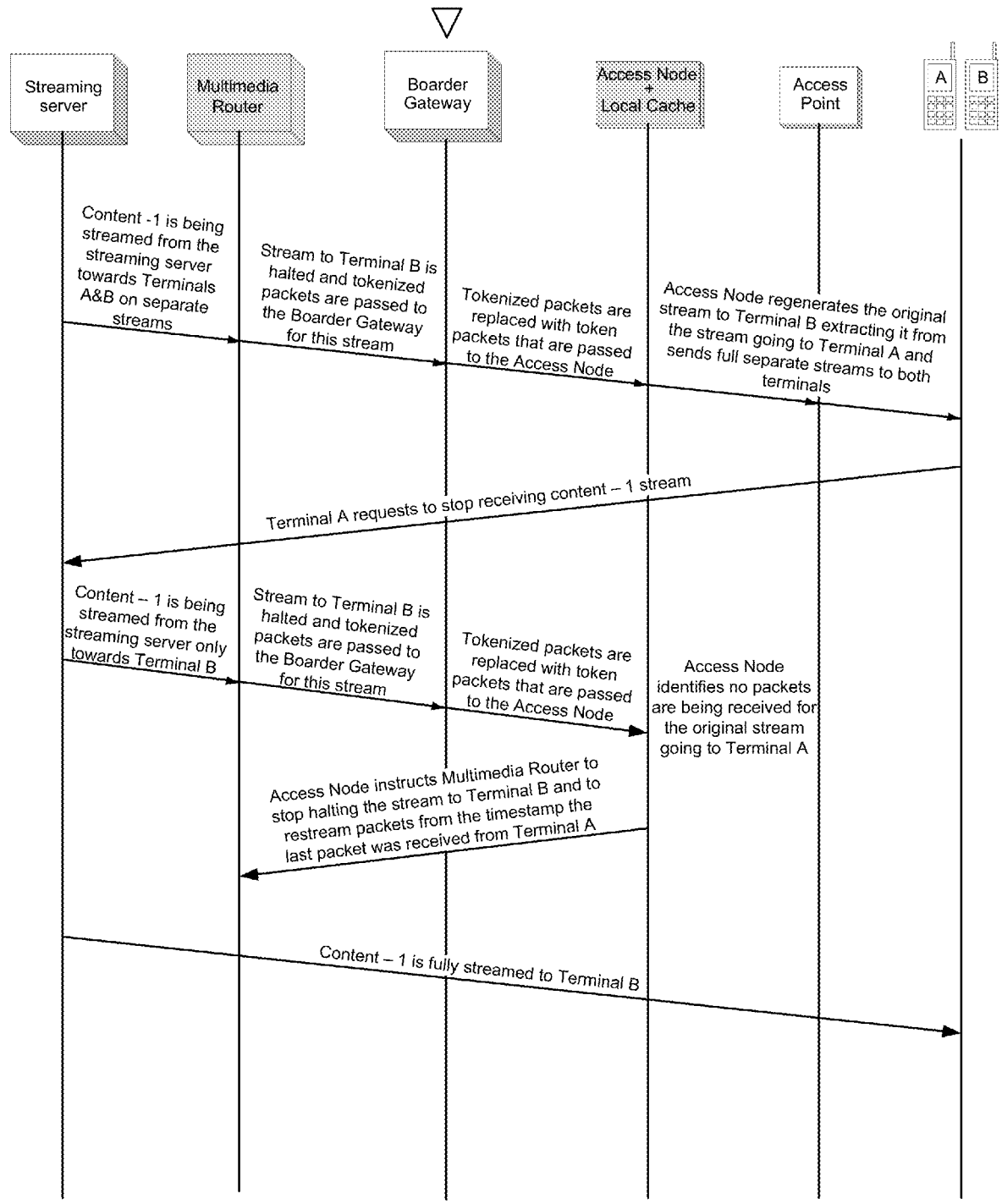
FIG. 4C2

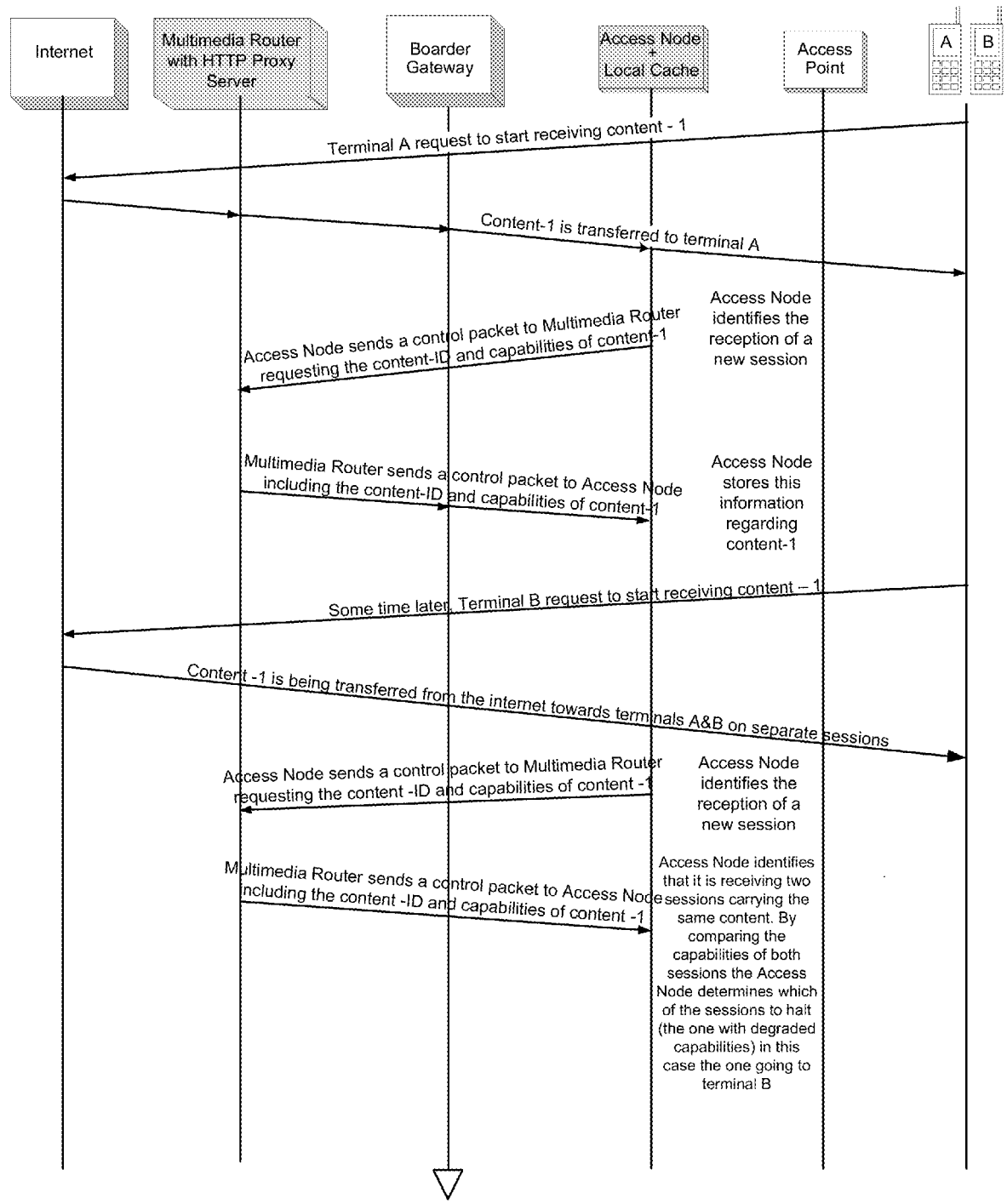
FIG. 4D1

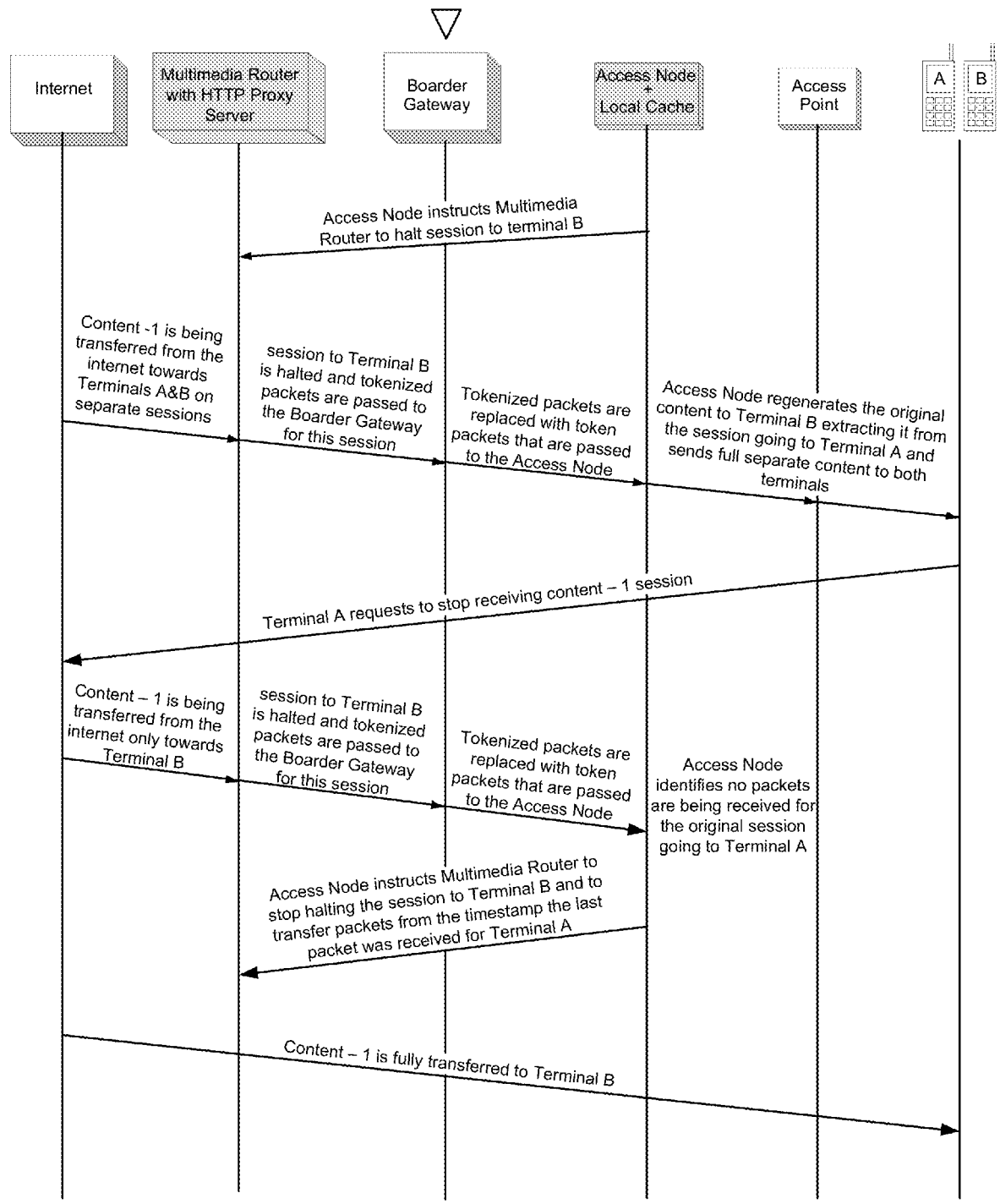
FIG. 4D2

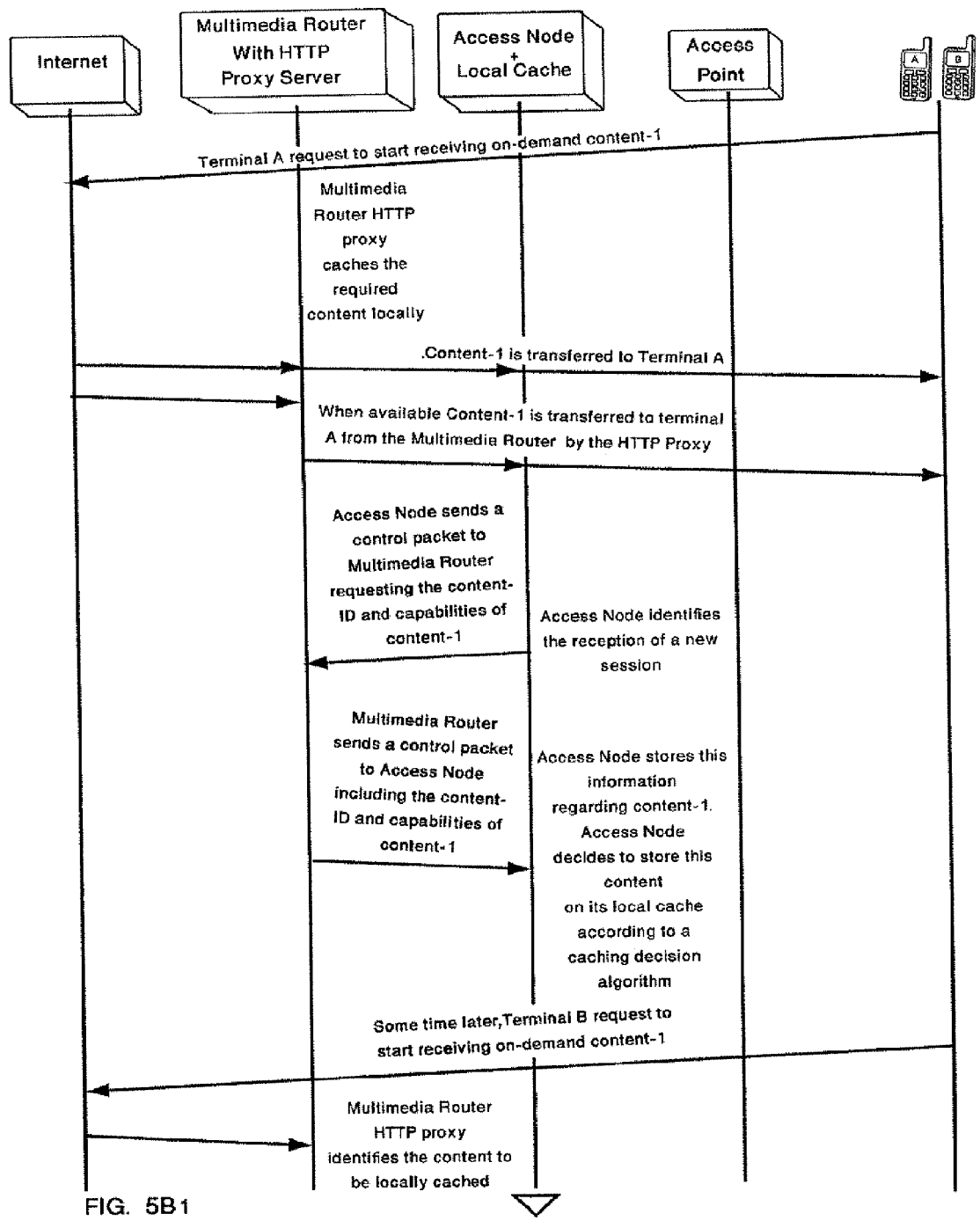
FIG. 5B1

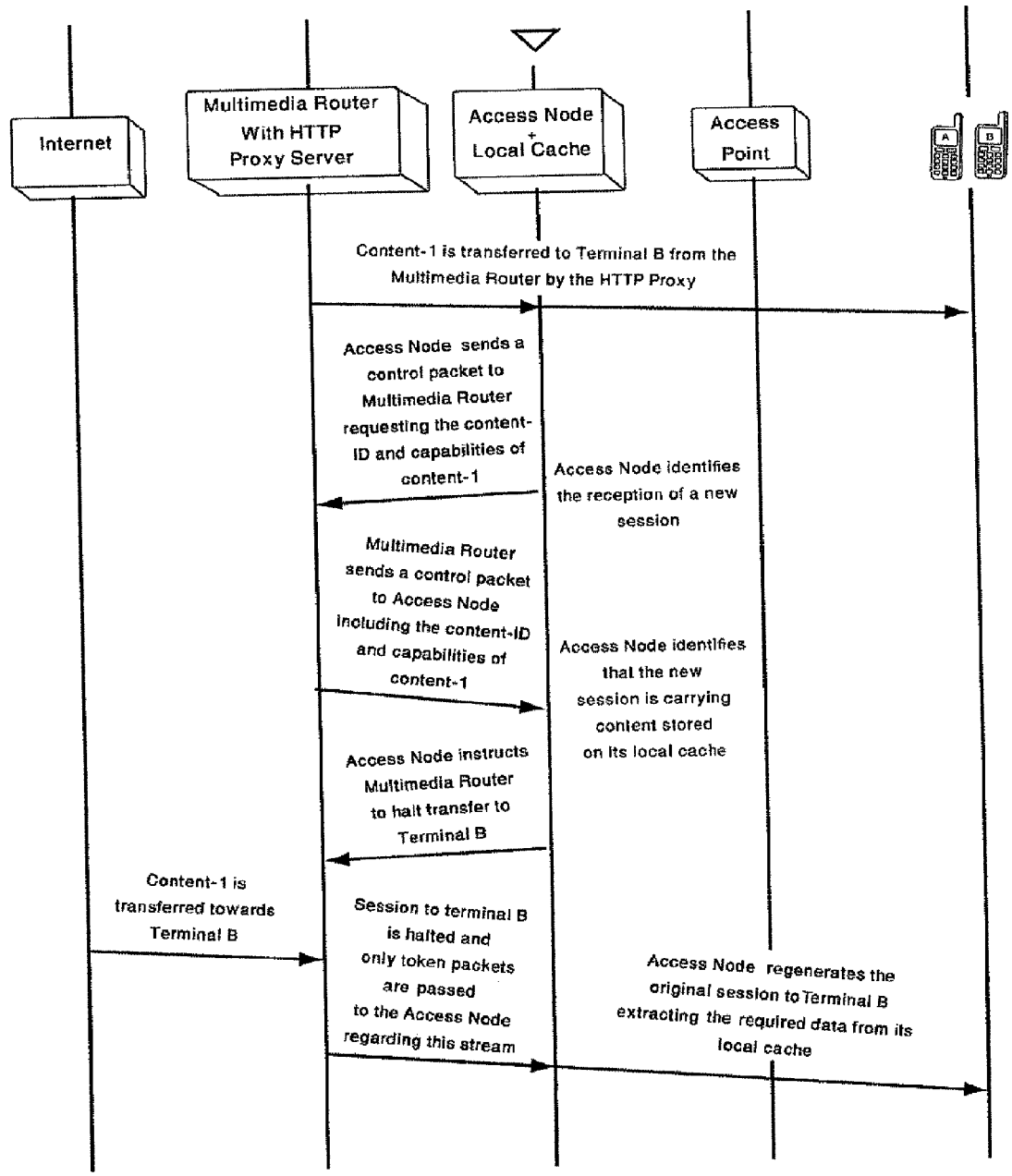
FIG. 5B2

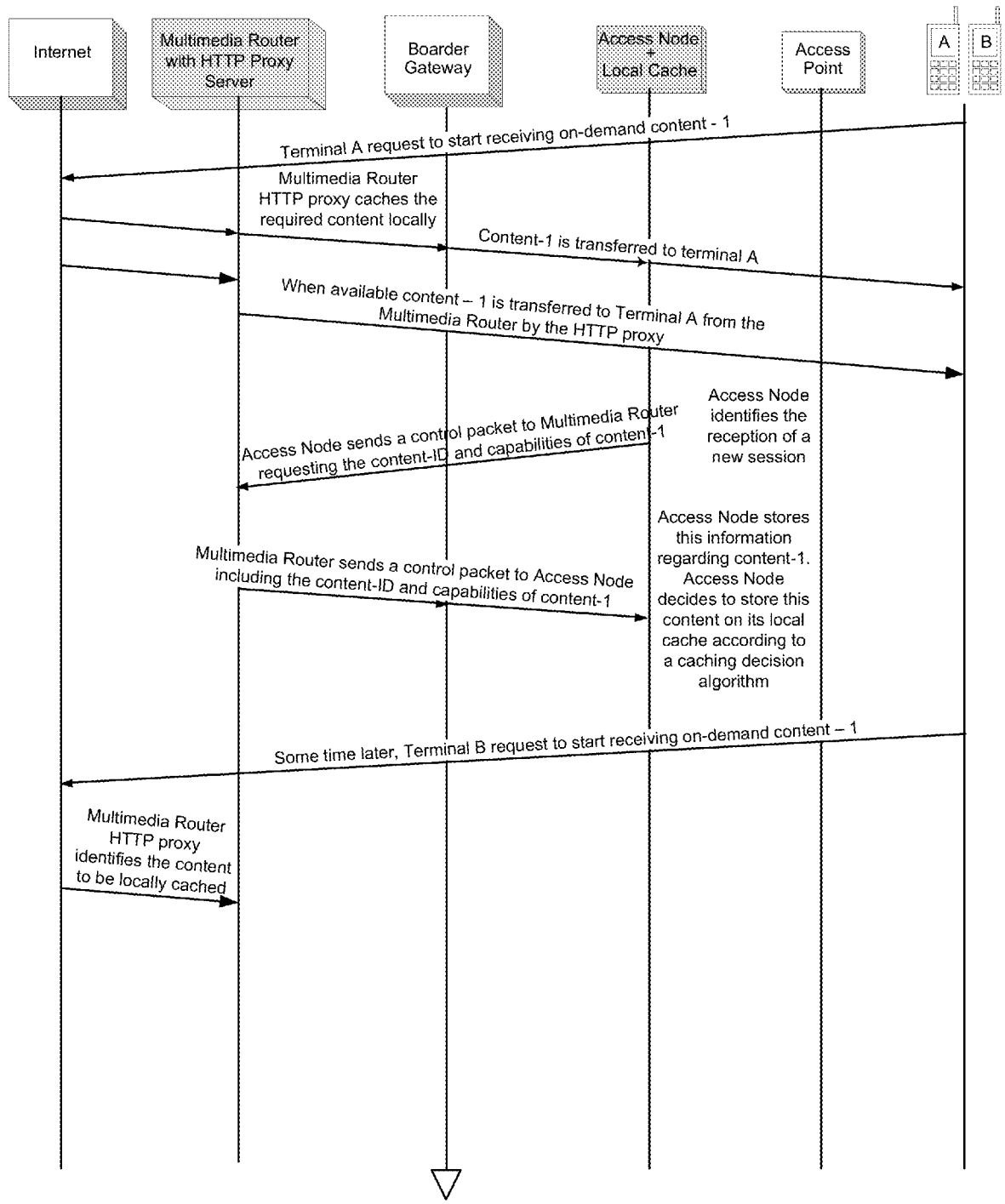
FIG. 5D1

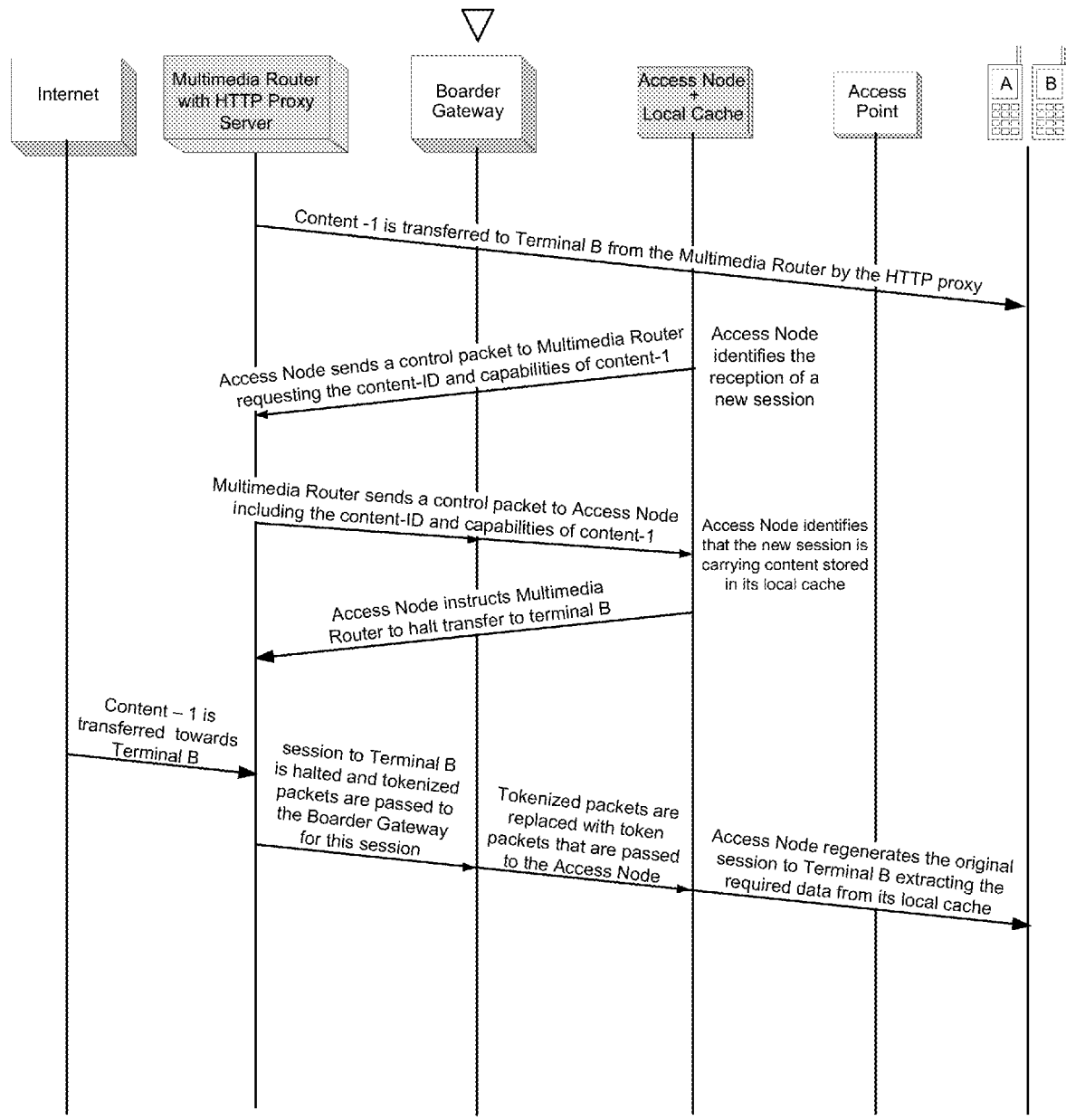
FIG. 5D2

METHODS CIRCUITS DEVICES SYSTEMS AND ASSOCIATED MACHINE EXECUTABLE CODE FOR EFFICIENT DELIVERY OF MULTI-UNICAST COMMUNICATION TRAFFIC

RELATED APPLICATIONS

The present patent application is a continuation in part of U.S. patent application Ser. No. 14/455,955 for "A System and Method for Efficient Delivery of Multi-Unicast Communication Traffic" filed on Aug. 11, 2014 and having a priority date of Jul. 14, 2009. The present application claims the same priority date for subject-matter shared with the parent application, which parent application is also hereby incorporated by reference in its entirety.

FIELD OF THE INVENTION

The present invention generally relates to the field of Computer Networks. More specifically, the present invention relates to systems and methods for efficient delivery of multi-unicast communication traffic in computerized networks.

BACKGROUND

In recent years, the offering of broadband capabilities to the end users is becoming a commodity. Major consuming drivers for these capabilities are the demand for live and on-demand content streaming to end user. The main issue with this is the very high bandwidth requirements these types of services impose on the network. When looking specifically at wireless networks, an additional issue arises—wireless networks are characterized as having limited bandwidth, unstable behavior of the RF link, high error rates and long delays that evolve throughout the networks and are thus far from being optimal infrastructure for these types of applications.

Much work has been done in recent years in order to improve efficiency of delivery of type of content over different networks, thus reducing the traffic load throughout the network and improving the overall network utilization. Currently 3 main technologies exist for moving live content from a source to multiple destinations:

1. Broadcast—usually done over dedicated networks which are specifically built for content broadcast, such as DVB-S, DVB-T, DVB-H and many others;
2. Multicast (IGMP)—a protocol defined over an IP network to stream identical content to multiple users; and
3. Unicast—a method for transmitting content to each user over a dedicated link from a source to a destination.

In new and modern content delivery systems personalization capabilities are a key requirement. The ability to personalize live content to end users in terms of bit rate and/or special content add-ons such as adverts is essential. Multicast streaming delivery systems can't provide the means to personalize the content. On the other hand personalized unicast streaming is not cost effective due to the high cost-per-bit associated with it.

The solutions that exist today for moving on-demand content to end users are based on signaling re-direction between the main server and local servers, by deploying local servers. This type of solution has several drawbacks as it requires business agreements between the operators controlling the main servers and the local operators controlling the local servers. In addition, issues exist regarding the traffic management and traffic statistics as these aren't centralized in the main server thus driving a much more complicated billing solution.

In mobile networks this type of solution isn't feasible due to the mobility of the terminal between areas served by different local servers. Thus, a new "unicast natured" autonomous caching solution, which works in a transparent manner both regarding the central server and the end user without influencing the way the network is managed and served, is required.

The present invention discloses a system and method for providing some or all of the following:

Means of sending live personalized content over a network while consuming bandwidth substantially similar to that of multicast streaming;

Means of caching on-demand content at, or at the vicinity of, the access points, while maintaining the behavior of a centralized CDN (content delivery network), and supporting mobility in wireless networks; and Means of "adjusting" wireline and wireless network infrastructures to enable optimized high bandwidth media streaming.

SUMMARY OF THE INVENTION

The present invention includes methods, circuits, devices, systems and associated machine executable code for efficient delivery of multi-unicast communication traffic. According to some embodiments of the present invention, there may be provided clusters comprising one or more multimedia routers functionally associated with one or more access nodes. The one or more multimedia routers may be adapted to utilize a recognition algorithm for examining/analyzing and accordingly marking/identifying specific contents. According to further embodiments of the present invention, one or more of the access nodes may be adapted to cache certain contents based on their marking/identification and to later use some or all of their cached contents, and/or identical live contents of a different session with the same access node; as substitutes for redundant traffic it is receiving/handling. According to further embodiments of the present invention, a traffic optimization mechanism may be adapted to adjust contents' transfer rate so as to substantially optimally-match current network conditions, based on flow control information passed from one or more terminals/access-points through the network.

According to some embodiments of the present invention, there may be a border gateway located at or substantially near the entrance to the backhaul of a mobile network, and functionally associated with one or more multimedia routers. Border gateways may be implemented as a separate box, as a software module placed in current systems or as a combination of software modules on both current hardware components as well as new ones. The border gateway may receive packets coming from a multimedia router and manipulate the packets according to information stored in the packet or associated with the packet by the multimedia router. The packet manipulation may include the replacement of the packet by a token packet. According to some embodiments, a token packet may be a substantially small size packet representing the original packet, for example, a token packet may include the original packet's header with the required fixes, the original packet's length and the marking/identification of the packet.

According to some embodiments of the present invention, the multimedia routers may be located substantially in proximity to the Internet/service-servers entry/gateway into the network. Multimedia routers may be implemented as a separate box, as a software module placed in current systems or as a combination of software modules on both current hardware components as well as new ones. Multimedia routers may receive some or all media content/streams coming from the Internet and/or the service servers, and may run a content recognition algorithm using signaling information (e.g. Hypertext Transfer Protocol (HTTP), Real Time Streaming Protocol (RTSP)), a packet inspection algorithm, and/or a combination of both. Accordingly, contents may be paired with a unique ID, whereas the ID information may be passed to the access nodes alongside the actual content (e.g. through a management message protocol), and/or via a separate dedicated interface, and may then be used by the access nodes to detect redundant traffic it is receiving.

According to some embodiments of the present invention, the multimedia routers may receive management messages from the access nodes regarding sessions/streams that may be halted by them and regenerated locally in one or more of the access nodes, and regarding halted sessions/streams that should be fully transferred by multimedia routers. The multimedia routers may inspect relevant portions of the incoming sessions/streams and information received from the access nodes and may accordingly identify sessions/streams that are to be halted and halted sessions/streams that are to be fully transferred. According to other embodiments of the present invention, focused at controlled-protocols/acknowledged-communication (e.g. TCP), an HTTP proxy server may be implemented in one or more of the multimedia routers, or may be functionally associated with them. The HTTP proxy may manage the transmission of its cached content to the access nodes. Furthermore, when available in the network, one or more of the access nodes may send the proxy server information pertaining to the utility/condition/propagation-rate of the network towards one or more given terminals/accesses, thus enabling the HTTP proxy server to control the rate of TCP packets being sent out, so as to substantially optimally match the current network conditions.

According to some embodiments of the present invention, the multimedia routers may manipulate halted data streams so as to only send substantially small size token packets to the access nodes. These token packets may enable the access nodes to reproduce the content either from other fully transferred one or more streams/sessions containing the identical content (e.g. for a live session) or from its local cache (e.g. on-demand content stored on the access nodes' local cache).

According to some other embodiments of the present invention, the multimedia routers may manipulate halted data streams so as to send the packets as tokenized packets to the border gateway. The tokenized packets may be the original packets received by the multimedia router in which some fields are manipulated by the multimedia router, or the tokenized packets may be the original packets received by the multimedia router along with an associated packet accompanying the original packet and containing a token. These tokenized packets may enable the border gateway to strip off the packet's content and only send substantially small size token packets to the access nodes. These token packets may enable the access nodes to reproduce the content either from other fully transferred one or more streams/sessions containing the identical content (e.g. for a live session) or from its local cache (e.g. on-demand content stored on the access nodes' local cache).

According to some embodiments of the present invention, access nodes may be located substantially in proximity to the network's access point(s). Access nodes may inspect the content of some or all unicast streams/sessions and the corresponding ID information received from the multimedia routers or from the border gateway. Upon identification of an incoming unicast stream/session as being redundant (e.g. carrying identical content to that carried by a different stream/session received by this access node for live content, or carrying content stored on the local cache for on-demand content), the access node may send a dedicated management message to the respective multimedia router instructing it to halt that stream/session. Once the multimedia router has halted the stream/session, it may start sending only token packets to the respective access node, or tokenized packets to the border gateway which in turn may send only token packets to the respective access node, thus enabling the access node to locally regenerate the original content. After regenerating the genuine packets the access node may transfer them out to the relevant terminal. The access node may further support the insertion of personalized information into regenerated packets, such as advertisements.

According to further embodiments of the present invention, the stream/session may be kept halted until the access node detects that the cause for halting no longer exists, due to one of several possible reasons (e.g. different [i.e. substituting] 'identical content carrying' stream/session has been halted; substitute content stored on the local access node's cache has been removed to make place for other, higher rated, content), after which a 're-stream/re-transmit management message' may be sent from the access node to its respective multimedia router, causing it to stream/transmit the complete stream/session from that point on.

According to some embodiments of the present invention, in the event that an incoming unicast stream is recognized by an access node as an on-demand stream/content which is not locally stored on its local cache, the access node may utilize a decision algorithm to determine whether this content is to be stored locally. If the cache is full, the access node may use a content rating algorithm as to decide what content should be removed from the cache in order to make place for the new one. Additionally (or alternatively), content may be downloaded to the access nodes' local cache in a push mode.

According to some embodiments of the present invention, access nodes may probe flow control information sent from the terminals/access-points to the network. Based on the information gathered, the access nodes may be able to Trans-rate (i.e. change the rate of) any of the streams being sent to that terminal, setting it at a substantially optimal rate, thus reducing packet-loss in the network. Furthermore, access nodes may run a 'smart scheduling mechanism' enabling them to control scheduling/policing decisions according to the specific application of each stream. According to other embodiments of the present invention, flow control information sent from the terminals/access-points to the network may be passed back to the multimedia routers' HTTP proxy servers, which may accordingly set the rate of the packets sent to the access nodes for that session to the appropriate rate which may reduce the number of packets lost in the network. According to some embodiments of the present invention, multimedia routers and access nodes may route data streams to the current access point (e.g. cell) in which their targeted terminal(s) is located and/or enable a hand-off between cells, in networks supporting nomadic terminals (e.g. Mobile Cellular, Wimax).

According to some embodiments of the present invention, each or some of the aforementioned network access nodes may comprise a first communication module adapted to receive one or more data streams, wherein each of the one or more data streams is addressed to a separate terminal connected to said access node through a second communication module.

According to further embodiments of the present invention, the access node's second communication module may be adapted to maintain a first communication session with a first terminal and a second communication session with a second terminal.

According to further embodiments of the present invention, each or some of the network access nodes may comprise a stream generator adapted to use at least a portion of a received data stream addressed to the first terminal in order to generate at least a portion of a data stream sent to the second terminal through the second communication session.

According to further embodiments of the present invention, the access node's first and the second communication modules may each comprise one or more communication sub-modules. Furthermore, at least some of said one or more communication sub-modules may run on a different physical interface.

According to further embodiments of the present invention, the access node may further comprise a data stream cache that may be adapted to temporarily store at least a portion of the received data stream addressed to the first terminal. The access node's stream generator may use data stored in the cache in order to generate the data stream sent to the terminal over the second session. According to further embodiments of the present invention, the cache's storage policy may be based on a rating algorithm adapted to rate/grade at least some of the data streams. According to yet further embodiments of the present invention, the access node's data stream cache may be further adapted to receive and temporarily store pushed non-addressed data.

According to further embodiments of the present invention, the access node may further comprise control logic that may be adapted to detect when the second terminal requests the same stream as the first terminal requested and may be further adapted to trigger the stream generator in response to the detection. The control logic may be further adapted to detect when the second terminal requests content that is already cached locally in the access node and to trigger the stream generator in response to the detection. Furthermore, the control logic may be adapted to signal an associated network router to halt transmission of the stream requested by the second terminal.

According to further embodiments of the present invention, the control logic may be further adapted to signal an associated network proxy to send receipt acknowledgments of TCP/IP packets associated with the data stream requested by the second terminal.

According to further embodiments of the present invention, the stream generator may be further adapted to introduce terminal specific content into one or more of the data streams it has generated. The terminal specific content may be based on a request from its destination terminal. According to yet further embodiments of the present invention, the control logic may be further adapted to signal its associated network router not to halt transmission of terminal specific content requested by the second terminal.

According some embodiments of the present invention, each or some of the aforementioned network-gateway/multimedia routers may comprise a first communication module that may be adapted to establish communication sessions with one or more content sources; a second communication module that may be adapted to establish a communication session with each of one or more network terminal access nodes.

According to further embodiments of the present invention, each or some of the aforementioned network-gateway/multimedia routers may further comprise routing logic that may be adapted to sniff the second communication module for data stream requests, wherein a first data stream request from a first terminal and a second data stream request from a second terminal may be coming from terminals connected to the same access node.

According to further embodiments of the present invention, the routing logic may be adapted to perform some or all of the following: (1) forward through the first communication module the first and the second requests to the source of the requested content, (2) forward to the first access node one or more data streams received in response to the forwarded first and second requests, and (3) to halt forwarding of a received data stream in response to signaling information from the first access node.

According to further embodiments of the present invention, the network-gateway/multimedia routers' first and second communication modules may each comprise one or more communication sub-modules. Further, at least some of said one or more communication sub-modules may run on a different physical interface.

According to further embodiments of the present invention, the routing logic may be further adapted to resume the streaming of a halted data stream in response to signaling information from the first access node.

According to further embodiments of the present invention, the network-gateway/multimedia router may further comprise a proxy server functionally associated with it. The proxy server may be adapted to cache content locally, and the routing logic may be further adapted to forward said proxy's locally cached content towards the first access node as full stream when said content is not cached at the first access node, and as control tokens when the content is locally cached at the first access node. According to other embodiments of the present invention, the proxy server may be adapted to cache content locally, and the routing logic may be further adapted to forward said proxy's locally cached content towards the border gateway as full stream when said content is not cached at the first access node, and as tokenized packets when the content is locally cached at the first access node. The border gateway may be further adapted to forward towards the first access node full stream packets it may receive from the multimedia router, and control tokens when it receives tokenized packets from the multimedia router.

According to further embodiments of the present invention, the control tokens may be used by the first access node to reproduce streams substantially identical to the full streams, based on said locally cached content cached at the first access node.

According to other embodiments of the present invention, each or some of the aforementioned network access nodes may comprise a first communication module that may be adapted to receive one or more data streams, wherein each of the one or more data streams may be addressed to a terminal connected to the access node through a second communication module.

According to further embodiments of the present invention, the second communication module may be adapted to maintain a first communication session with a first application running on a terminal and a second communication session with a second application running on the same terminal. The stream generator may be adapted to use at least a portion of a received data stream addressed to the first application in order to generate at least a portion of a data stream sent to the second application through the second communication session.

According to further embodiments of the present invention, each or some of the aforementioned network-gateway/ multimedia routers may comprise a first communication module that may be adapted to establish communication sessions with one or more content sources, and a second communication module that may be adapted to establish a communication session with each of one or more network terminal access nodes.

According to further embodiments of the present invention, each or some of the aforementioned network-gateway/ multimedia routers may further comprise routing logic that may be adapted to sniff the second communication module for data stream requests, a first data stream request from a first application running on a terminal and a second data stream request from a second application running on the same terminal, which terminal may be connected to an access node.

According to further embodiments of the present invention, the routing logic may be adapted to perform some or all of the following: (1) forward through the first communication module the first and the second requests to the source of the requested content, (2) forward to the first access node one or more data streams received in response to the forwarded first and second requests, and (3) to halt forwarding of a received data stream in response to signaling information from the first access node.

According to some embodiments of the present invention, there may be provided a method of transporting content data across a data communication network, wherein the method may include: (1) detecting within a data packet which has entered the network content data which is already present at or near a destination access node of the data packet; (2) converting the data packet into a token packet, which token packet may be substantially missing the identified content data, and wherein converting may include either modifying or replacing the data packet; (3) conveying the token packet to the destination access node; and (4) at or near the destination access node substantially regenerating the data packet, wherein regenerating may include either modifying or replacing the token packet.

According to some embodiments of the present invention, content data identification and conversion of the packet into a token packet may be performed at the same network node.

According to some embodiments of the present invention, content data identification may be performed at a first network node and conversion of the packet into a token packet may be performed at a second network node. According to some embodiments of the present invention, packets including identified content may be tagged for tokenization.

According to some embodiments of the present invention, the token packet may be transported across a network backhaul link to the destination access node.

According to some embodiments of the present invention, there may be provided a communication network adapted to deliver content to a mobile communication device communicatively coupled to an access node of the communication network, the network may include: (1) packet inspection logic to detect within a data packet which has entered the network content data which is already present at or near a destination access node of the data packet; (2) first packet processing circuits to convert the data packet into a token packet, which token packet may substantially be missing the identified content data, and wherein converting may include either modifying or replacing the data packet; (3) packet transmission circuit to convey the token packet to the destination access node; and (4) second packet processing circuits at or near the destination access node substantially to regenerate the data packet, wherein regenerating may include either modifying or replacing the token packet.

According to some embodiments of the present invention, the packet inspection logic and the first packet processing circuits may be part of the same network appliance.

According to some embodiments of the present invention, the packet inspection logic may be part of a first network node and the first packet processing circuits may be part of a second network node.

According to some embodiments of the present invention, the packet inspection logic may flag packets detected to contain content data present at or near the destination access node, and the packet processing circuits may tokenize the flagged packet.

According to some embodiments of the present invention, the packet transmission circuit may be adapted to convey the token packet to the destination access node through a network backhaul link.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A presents a general view of an exemplary network that may enable the transfer and caching of traffic over unmanaged (e.g. UDP) nomadic networks (e.g. cellular), whereas FIG. 1B presents a general view of an exemplary network that may enable the transfer and caching of TCP traffic over managed and/or nomadic networks.

FIGS. $4A_1$, $4A_2$ and $4B_1$, $4B_2$ present exemplary communication flows in which the multimedia router and the access node communicate to halt and resume streams($4A_1$, $4A_2$)/sessions($4B_1$, $4B_2$) between themselves for live content, in accordance with some embodiments of the present invention.

FIGS. $4C_1$, $4C_2$ and $4D_1$, $4D_2$ present exemplary communication flows similar to those shown in FIGS. $4A_1$, $4A_2$ and $4B_1$, $4B_2$ in which the multimedia router sends tokenized packets and the border gateway replaces the tokenized packets with token packets which are sent to the access node in accordance with some embodiments of the present invention.

Figure 5A:
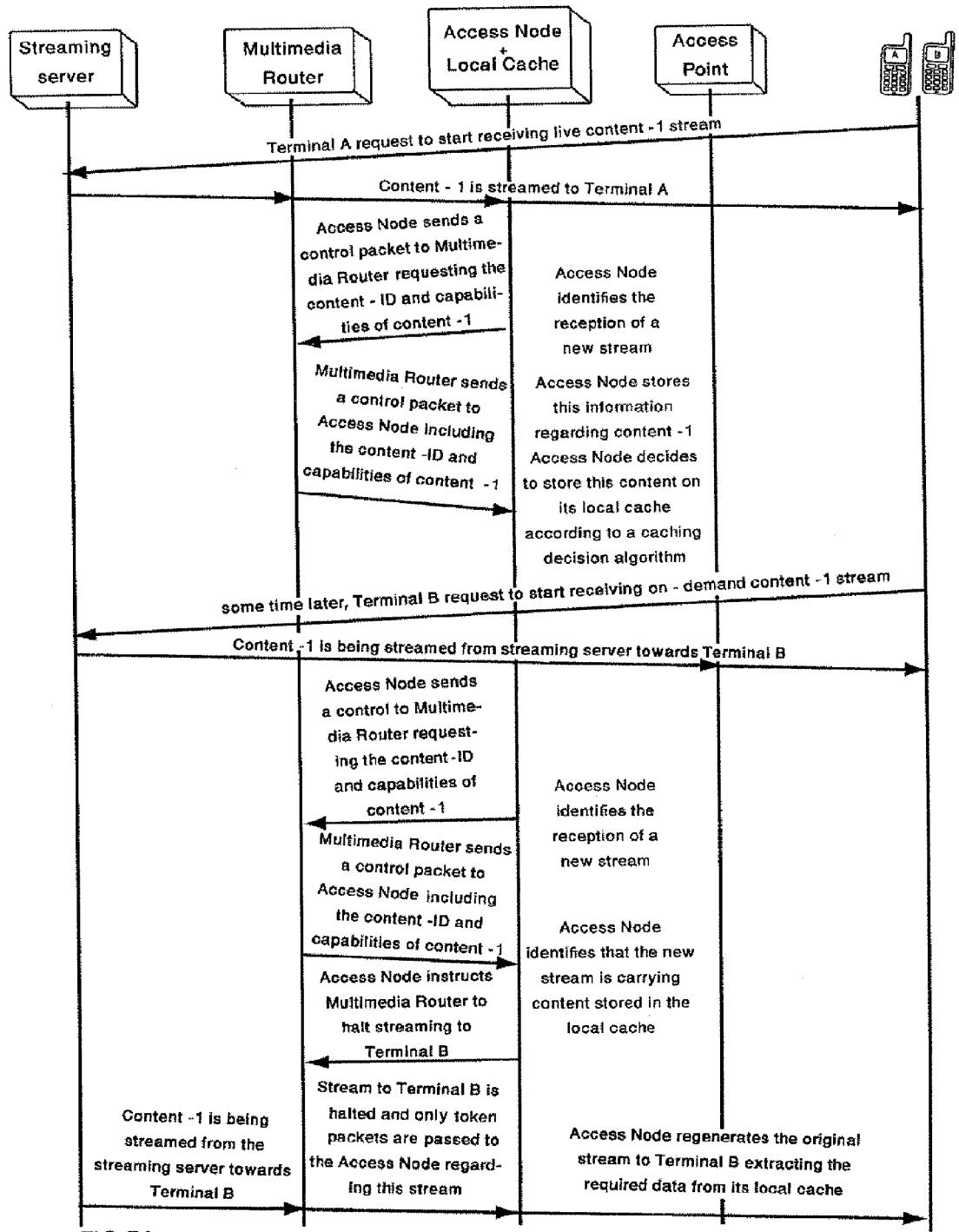

FIGS. 5A and $5B_1$, $5B_2$ present exemplary communication flows in which the multimedia router and the access node communicate to halt and resume streams(5A)/sessions ($5B_1$, $5B_2$) between themselves for on-demand content, in accordance with some embodiments of the present invention.

Figure 5C:
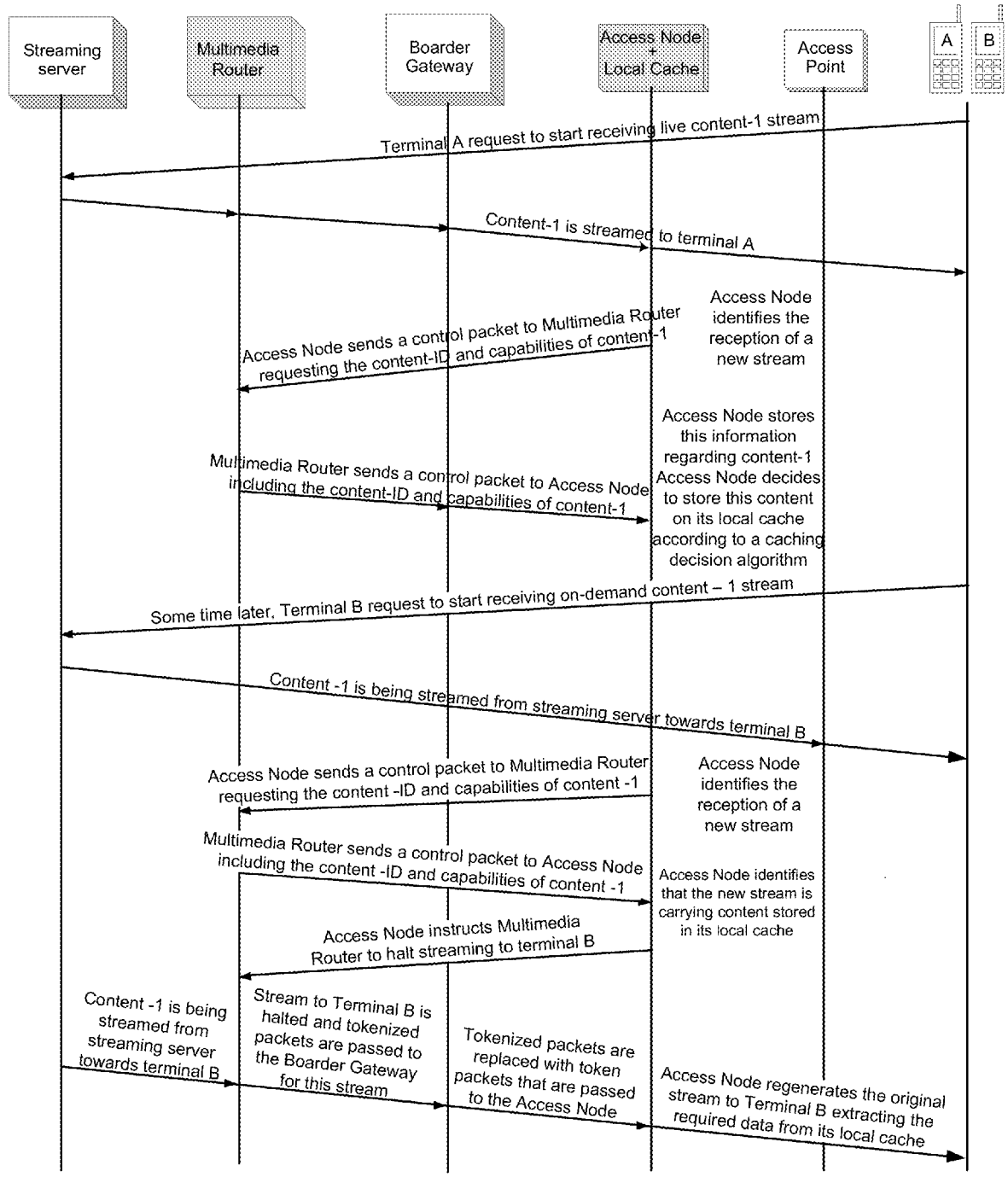

FIGS. 5C and 5D$_1$, 5D$_2$ present exemplary communication flows similar to those shown in FIGS. 5A and 5B$_1$, 5B$_2$ in which the multimedia router sends tokenized packets and the border gateway replaces the tokenized packets with token packets which are sent to the access node in accordance with some embodiments of the present invention.

Figure 6A:
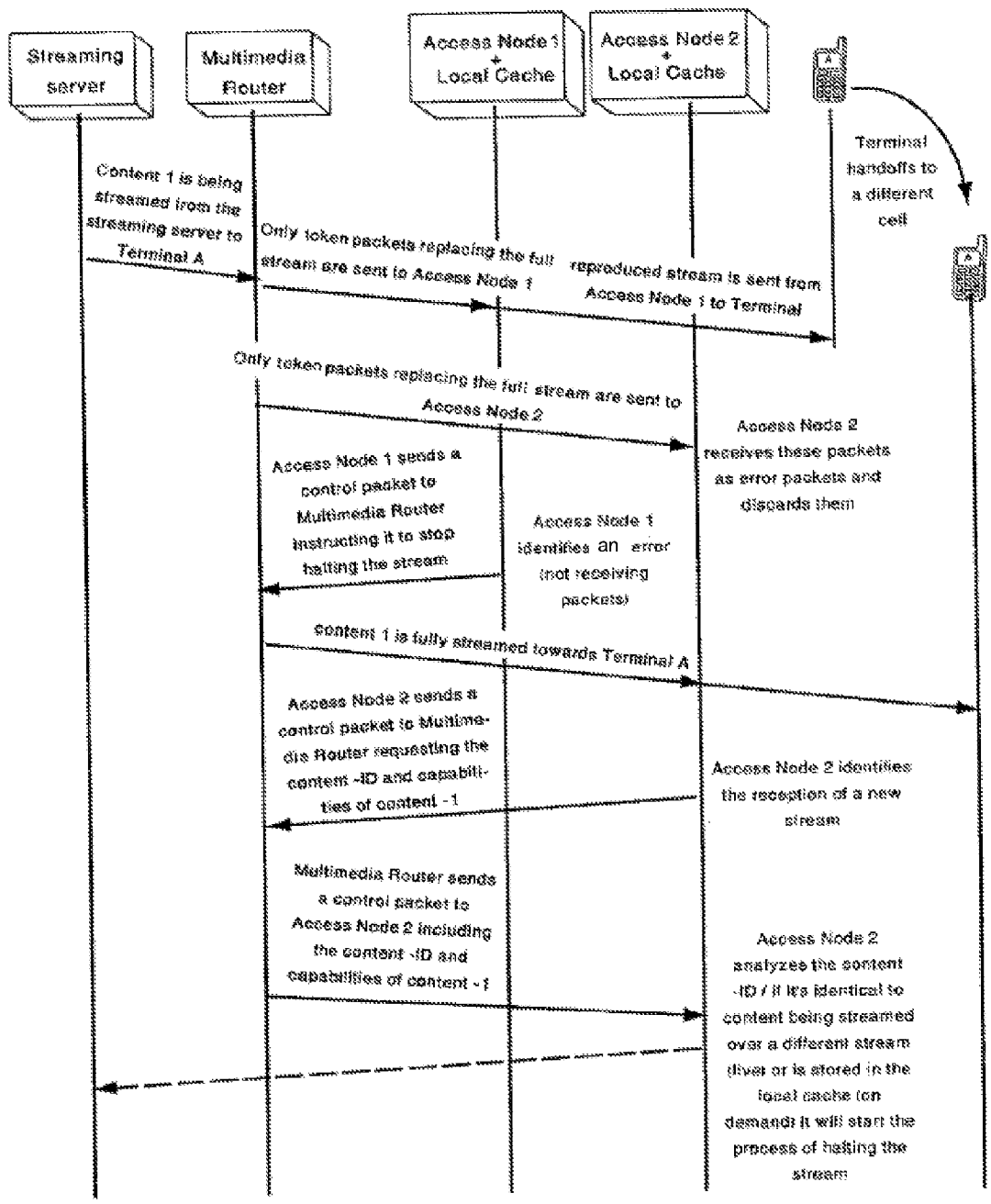
Figure 6B:
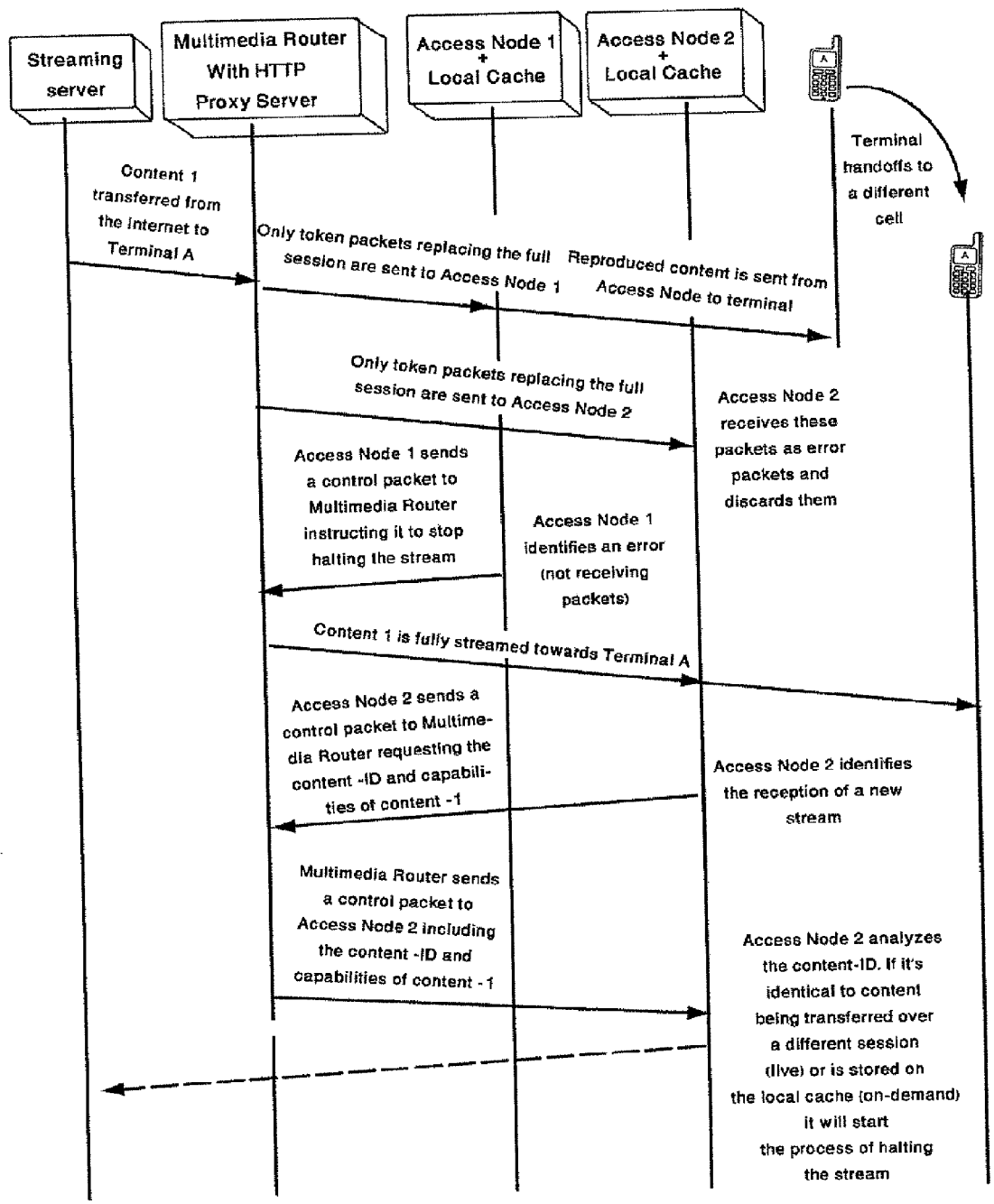

FIGS. 6A and 6B present exemplary communication flows and control messages which may be sent between the multimedia router and the respective access nodes, for a UDP stream (6A) or a TCP session (6B), so as to ensure continuous undisturbed data streaming, in accordance with some embodiments of the present invention.

Figure 6C:
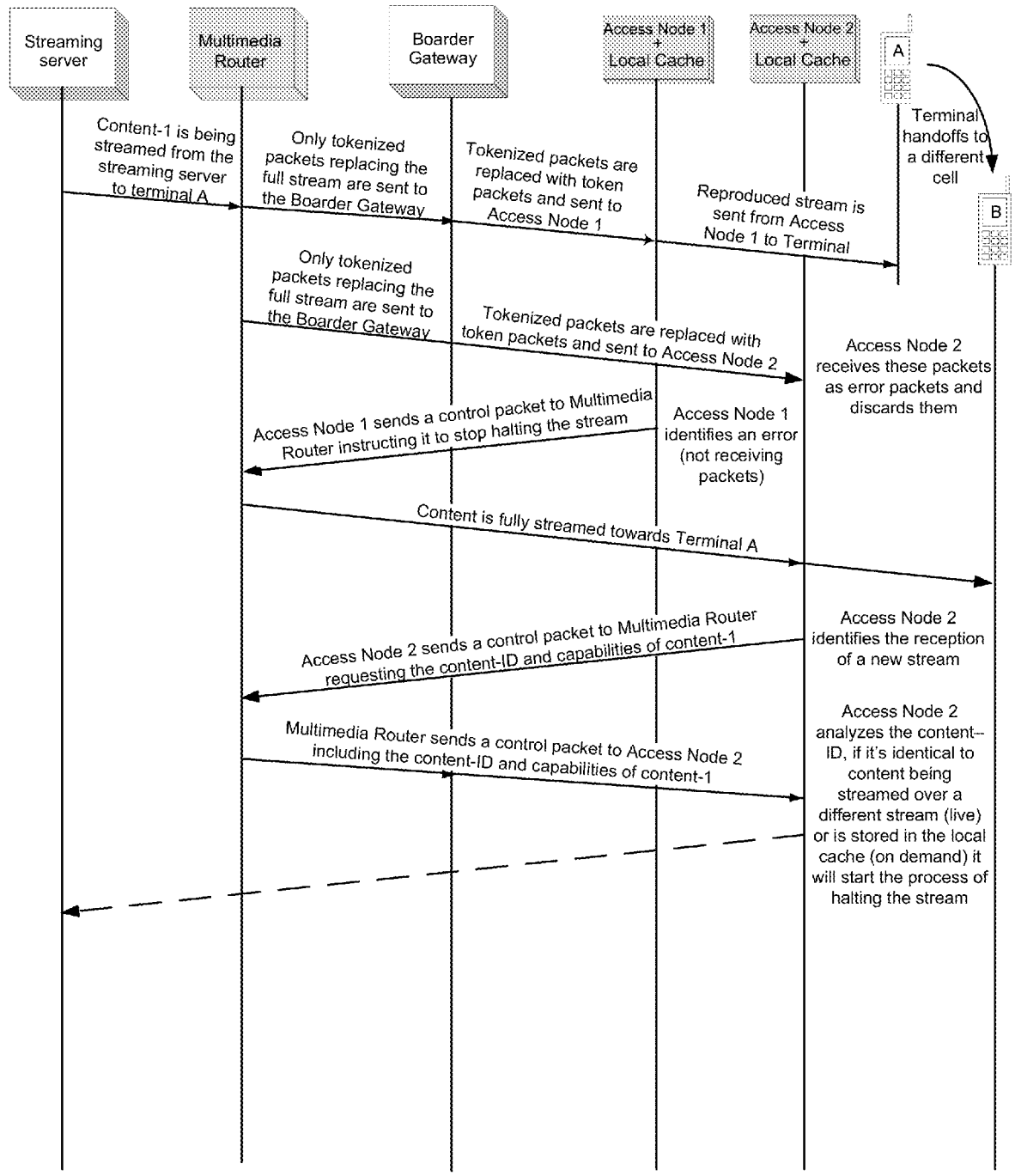
Figure 6D:
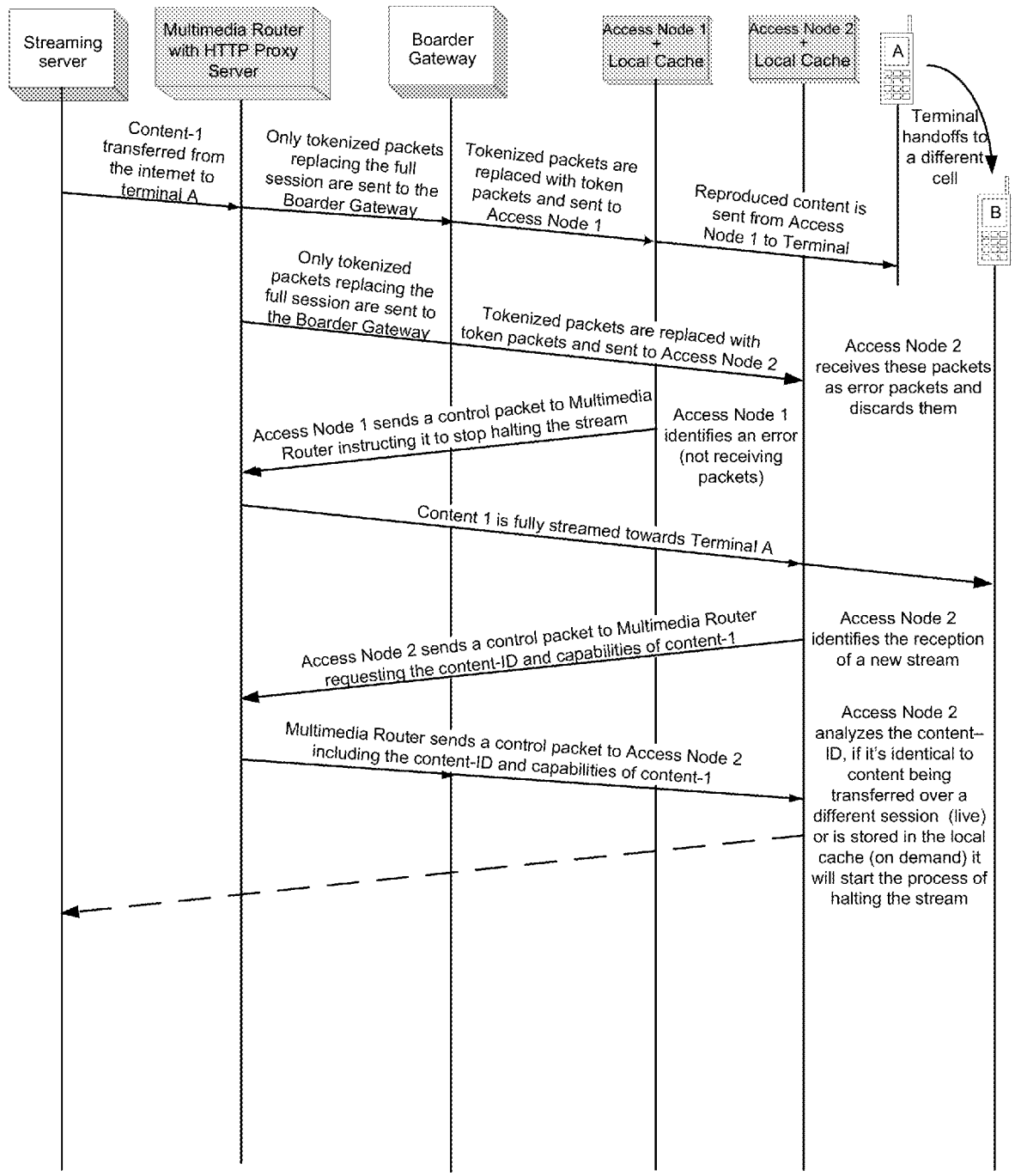

FIGS. 6C and 6D present exemplary communication flows similar to those shown in FIGS. 6A and 6B in which the multimedia router sends tokenized packets and the border gateway replaces the tokenized packets with token packets which are sent to the access nodes in accordance with some embodiments of the present invention.

Figure 7:
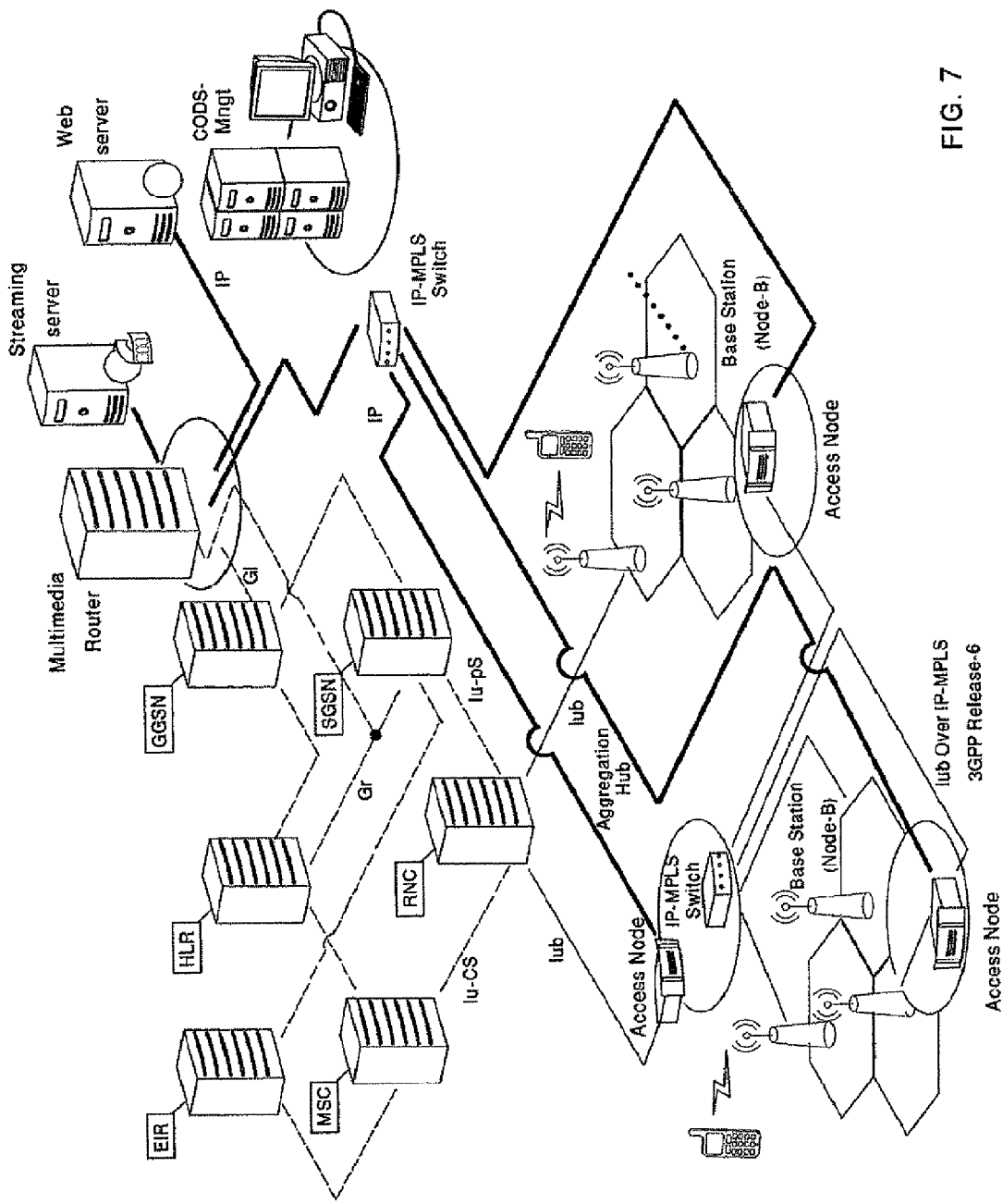

FIG. 7 presents an exemplary integration of the present invention into a mobile cellular network, in accordance with some embodiments of the present invention.

Figure 7A:
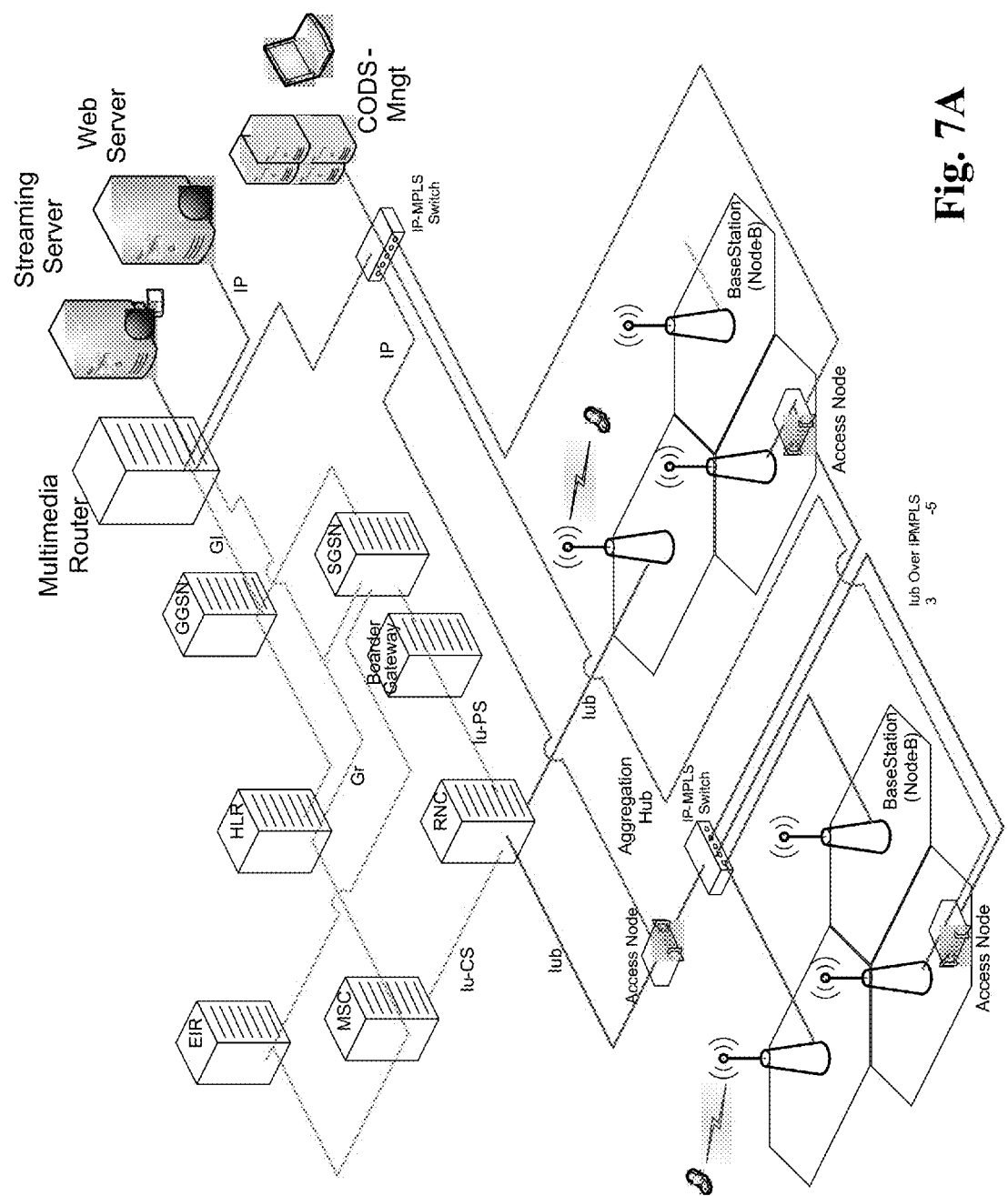

FIG. 7A presents an exemplary integration of the present invention including a border gateway into a mobile cellular network, in accordance with some embodiments of the present invention.

Figure 8:
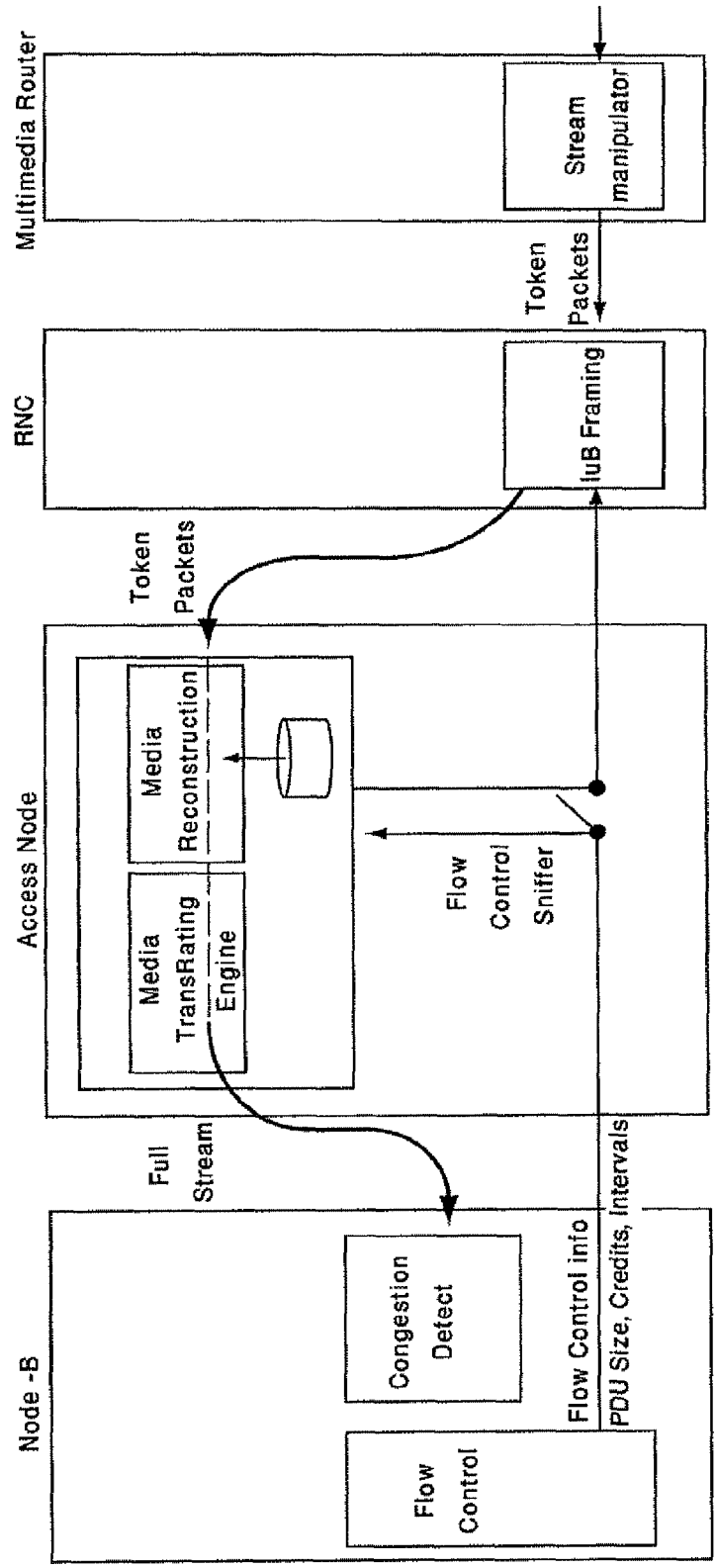

FIG. 8 presents an exemplary cross layer optimization mechanism for mobile wireless networks, in accordance with some embodiments of the present invention.

Figure 9:
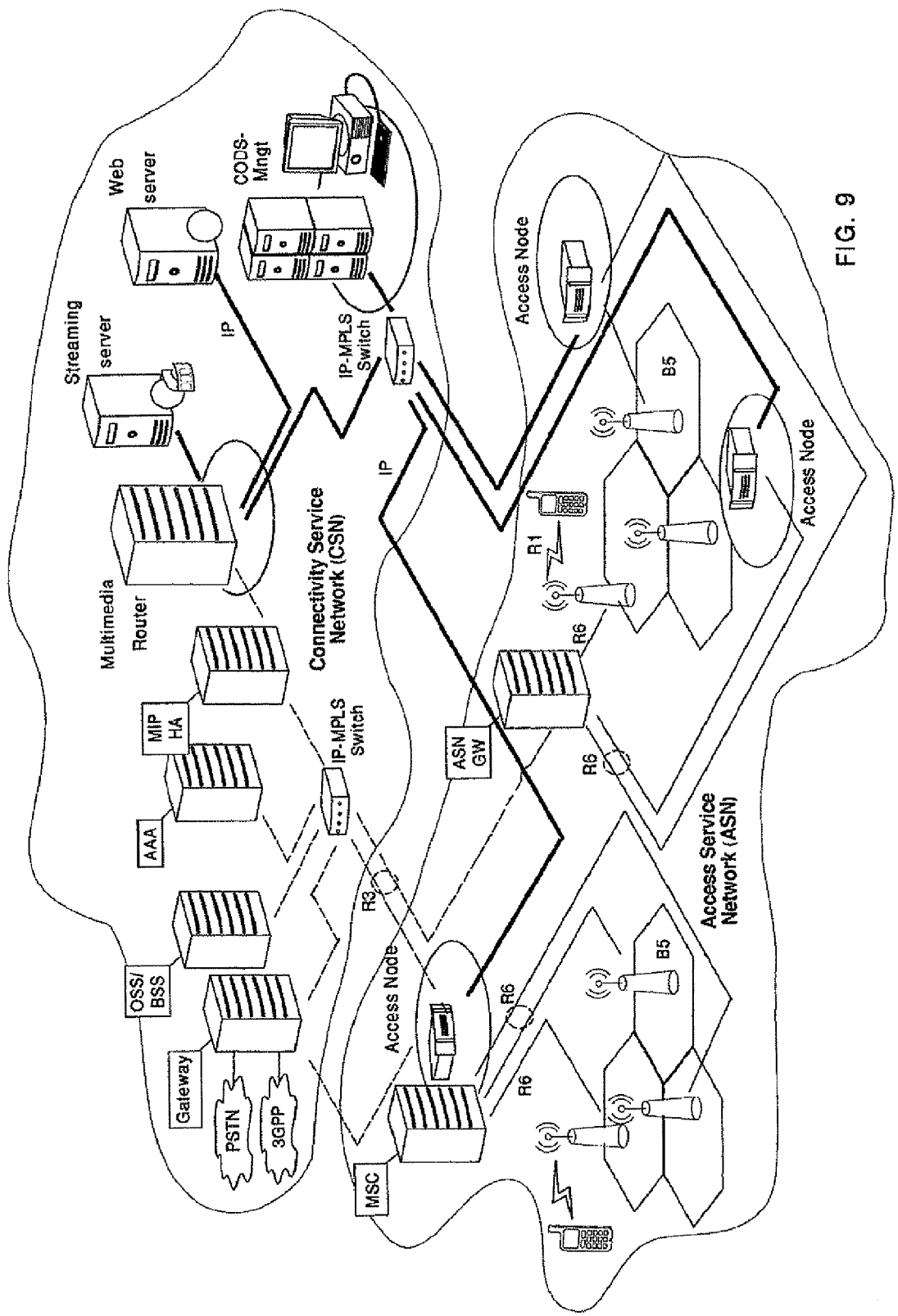

FIG. 9 presents an exemplary integration of the present invention into a mobile Wimax network, in accordance with some embodiments of the present invention.

Figure 9A:
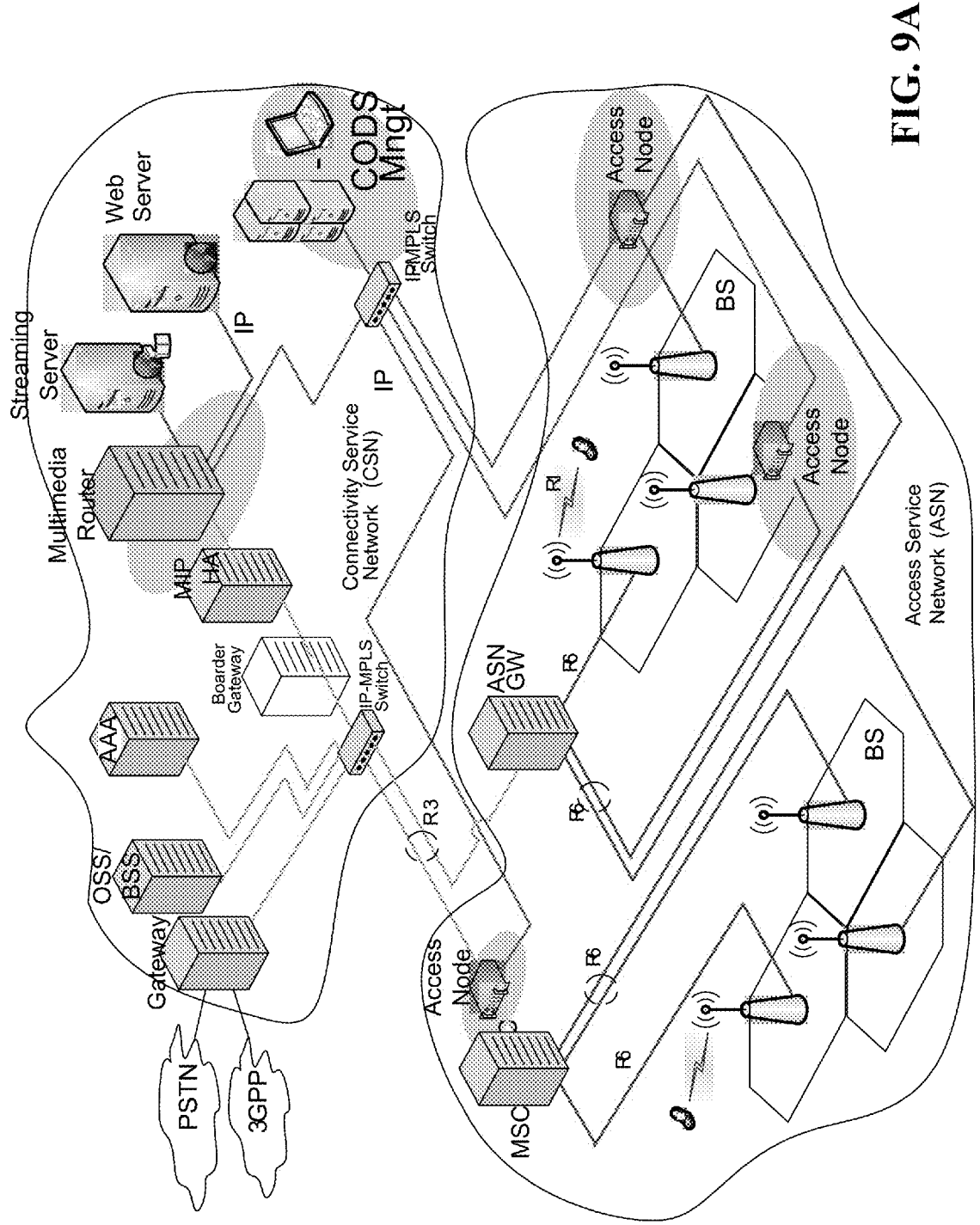

FIG. 9A presents an exemplary integration of the present invention including a border gateway into a mobile Wimax network, in accordance with some embodiments of the present invention.

Figure 10:
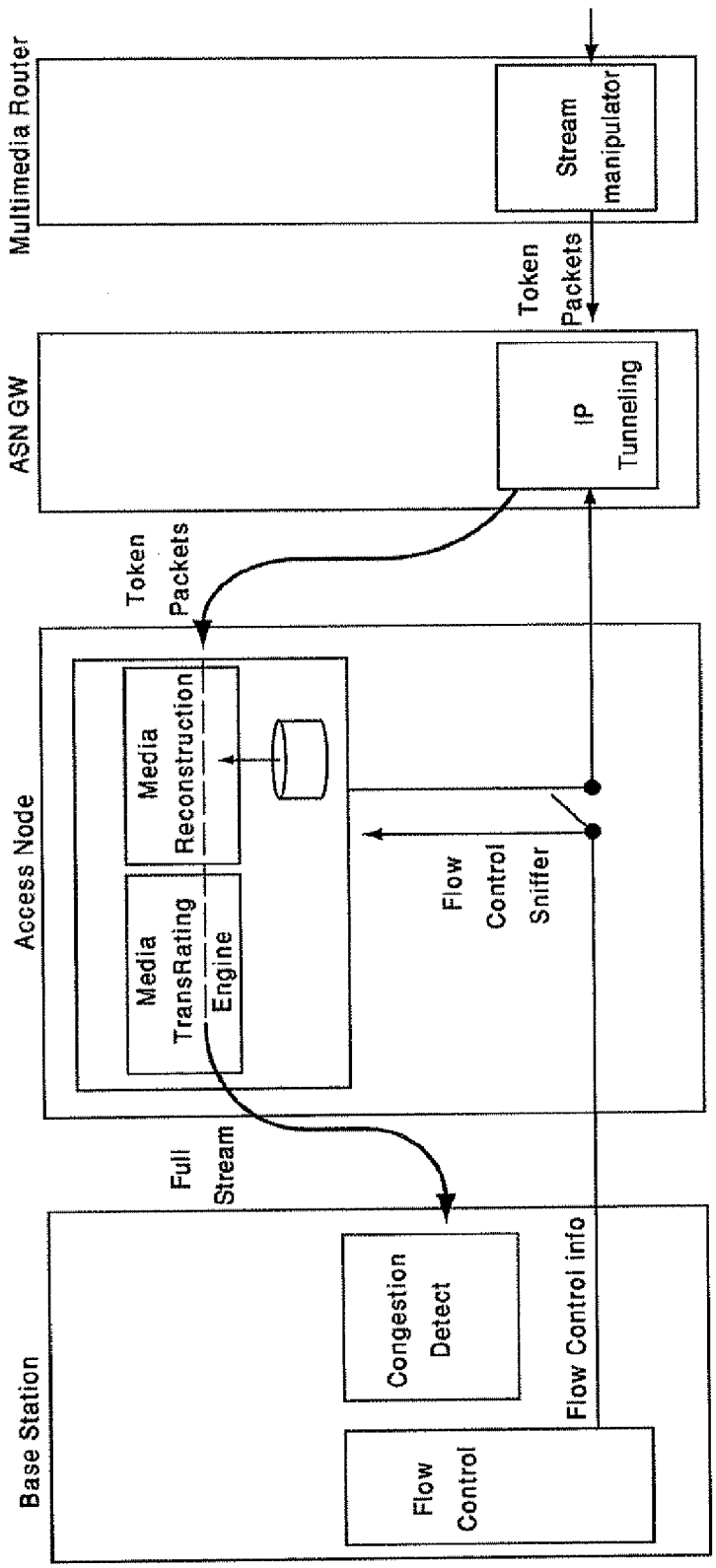

FIG. 10 presents an exemplary cross layer optimization mechanism for mobile Wimax networks, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only me (ROMs), ranaccess memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Furthermore, it should be understood that any topology, technology and/or standard for computer networking, known today or to be devised in the future, may be applicable to the present invention.

The present invention is a system and method for efficient delivery of multi-unicast communication traffic. According to some embodiments of the present invention, there may be provided clusters comprising one or more multimedia routers functionally associated with one or more access nodes. The one or more multimedia routers may be adapted to utilize a recognition algorithm for examining/analyzing and accordingly marking/identifying specific contents. According to further embodiments of the present invention, one or more of the access nodes may be adapted to cache certain contents based on their marking/identification and to later use some or all of their cached contents, and/or identical live contents of a different session with the same access node; as substitutes for redundant traffic it is receiving/handling. According to further embodiments of the present invention, a traffic optimization mechanism may be adapted to adjust contents' transfer rate so as to substantially optimally-match current network conditions, based on flow control information passed from one or more terminals/access-points through the network.

Figure 1A:
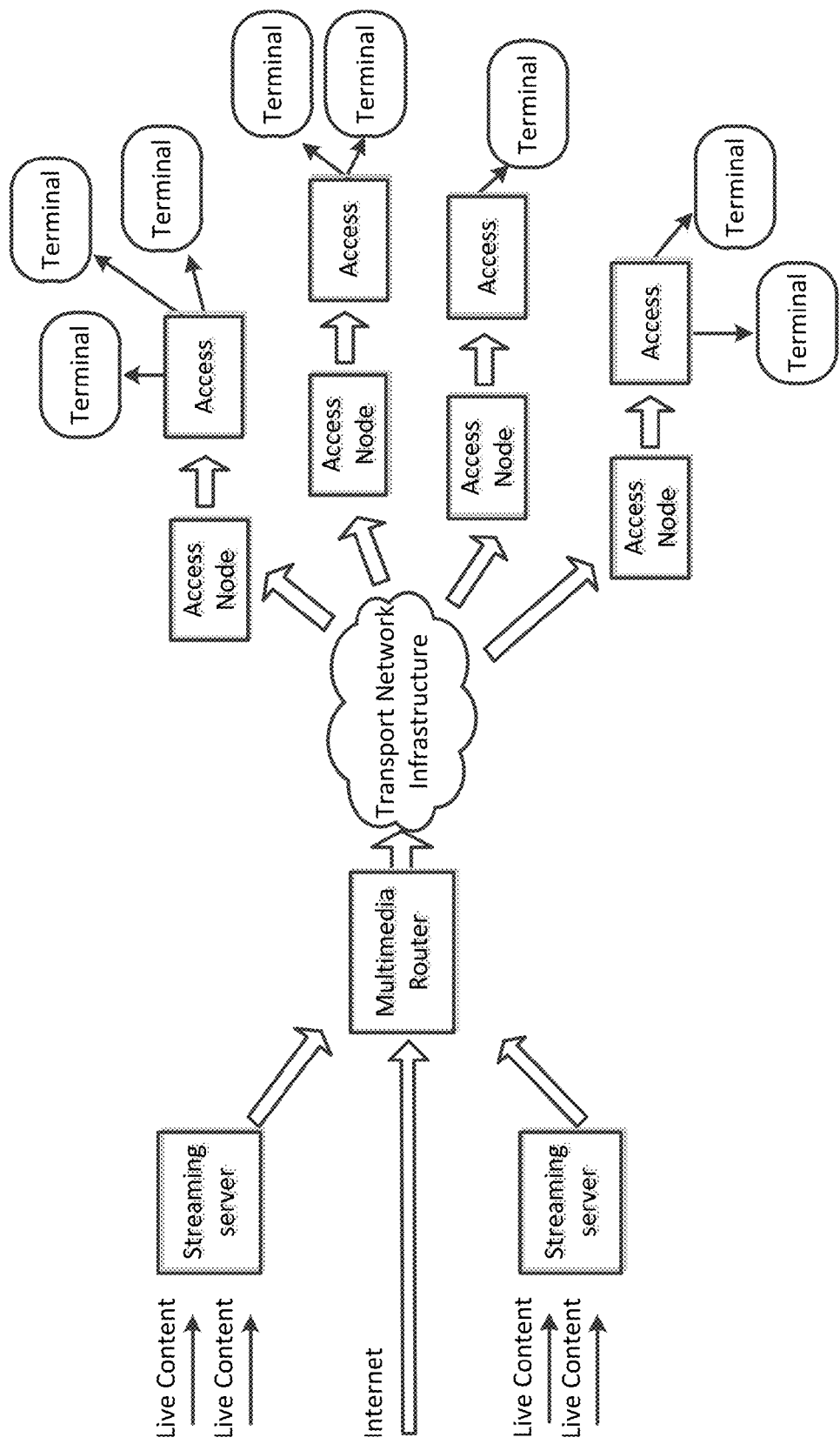
FIGS. 1A and 1B present exemplary general network descriptions, in accordance with some embodiments of the present invention.
Figure 1B:
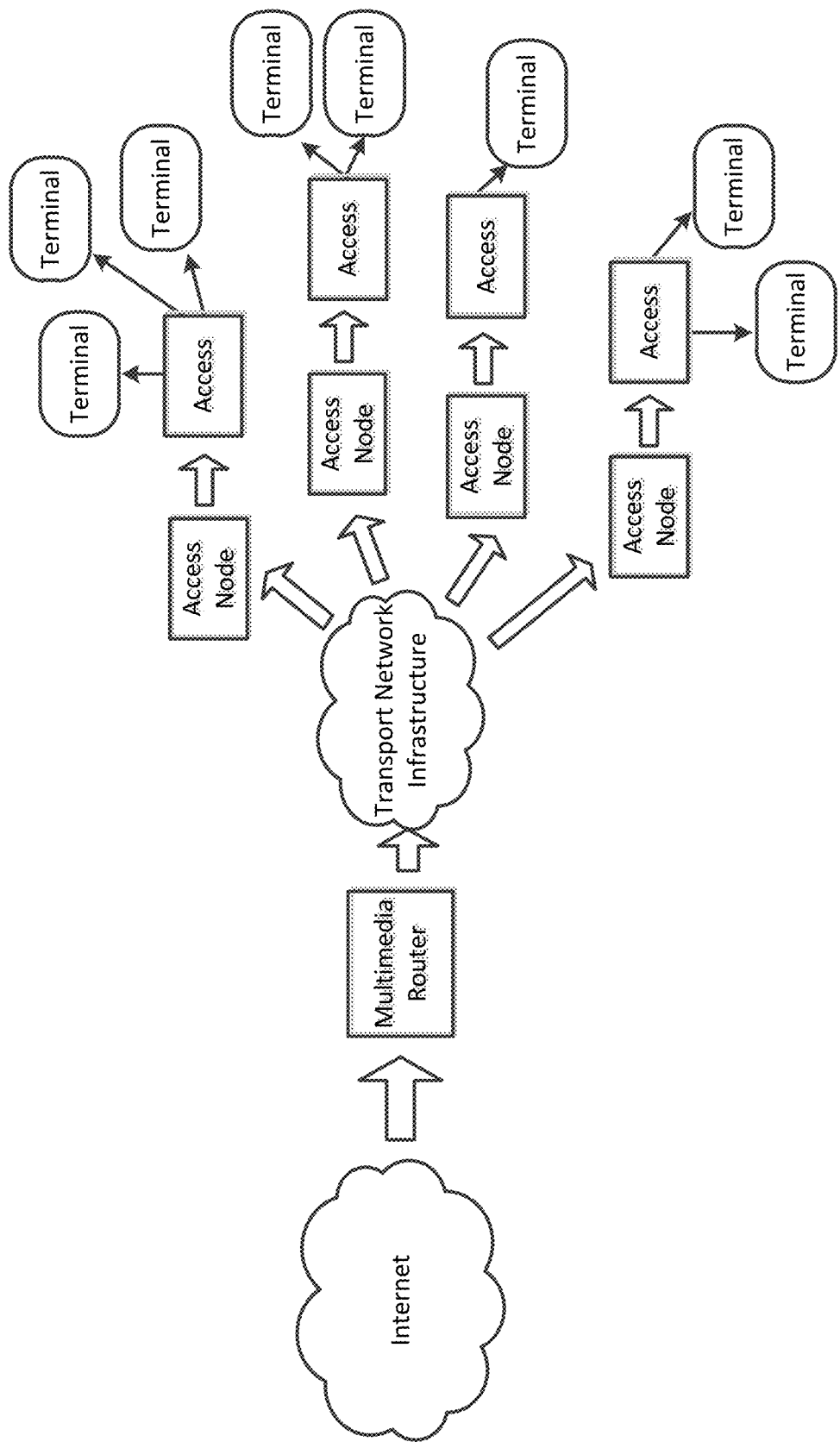

Reference is now made to FIGS. 1A and 1B where a general network description, in accordance with some embodiments of the present invention, is shown. FIG. 1A presents a general view of an exemplary network that may enable the transfer and caching of traffic over unmanaged (e.g. UDP), possibly nomadic networks (e.g. cellular), whereas FIG. 1B presents a general view of an exemplary network that may enable the transfer and caching of TCP traffic transmission and caching over managed, possibly nomadic networks. As can be seen, live contents from the Internet and/or from a streaming server (UDP traffic) or Internet (TCP) traffic transmissions may be analyzed and identified/labeled at the multimedia router. Labeled contents may then be transported through the Transport Network Infrastructure to the access nodes where their labels/identities will be examined. Contents carrying identical content to that carried by a different stream (for live content)/session received by the same access node and/or carrying content stored on the local cache for on-demand content, may be regarded as redundant and the access node may send a dedicated management message to the respective multimedia router instructing it to halt that stream/session.

According to some embodiments of the present invention, there may be a border gateway located at or substantially near the entrance to the backhaul of a mobile network, and functionally associated with one or more multimedia routers. Border gateways may be implemented as a separate box, as a software module placed in current systems or as a combination of software modules on both current hardware components as well as new ones. The border gateway may receive packets coming from a multimedia router and manipulate the packets according to information stored in the packet or associated with the packet by the multimedia router. The packet manipulation may include the replacement of the packet by a token packet. According to some embodiments, a token packet may be a substantially small size packet representing the original packet, for example, a token packet may include the original packet's header with the required fixes, the original packet's length and the marking/identification of the packet.

According to some embodiments of the present invention, the multimedia routers may be located substantially in proximity to the Internet/service-servers entry/gateway into the network. Multimedia routers may be implemented as a separate box, as a software module placed in current systems or as a combination of software modules on both current hardware components as well as new ones. Multimedia routers may receive some or all media content/streams coming from the Internet and/or the service servers, and may run a content recognition algorithm using signaling information (e.g. Hypertext Transfer Protocol (HTTP), Real Time Streaming Protocol (RTSP)), a packet inspection algorithm, and/or a combination of both. Accordingly, contents may be paired with a unique ID, whereas the ID information may be passed to the access nodes alongside the actual content (e.g. through a management message protocol) or in band, as part of the data stream and may then be used by the access nodes to detect redundant traffic it is receiving.

According to some embodiments of the present invention, the multimedia routers may receive management messages from the access nodes regarding sessions/streams that should be halted by them and regenerated locally in one or more of the access nodes, and regarding halted sessions/streams that should be fully transferred by multimedia routers. The multimedia routers may inspect relevant portions of the incoming sessions/streams and information received from the access nodes and may accordingly identify sessions/streams that are to be halted and halted sessions/streams that are to be fully transferred. According to other embodiments of the present invention, focused at controlled-protocols/acknowledged-communication (e.g. TCP), an HTTP proxy server may be implemented in the one or more of multimedia routers, or may be functionally associated with them. The HTTP proxy may manage the transmission of its cached content towards the access nodes. Furthermore, when available in the network, one or more of the access nodes may send the proxy server information pertaining to the utility/condition/propagation-rate of the network towards one or more given terminals/accesses, thus enabling the HTTP proxy server to control the rate of TCP packets being sent out, so as to substantially optimally match the current network conditions.

According to some embodiments of the present invention, the multimedia routers may manipulate halted data streams so as to only send substantially small size token packets to the access nodes. These token packets may enable the access nodes to reproduce the content either from other fully transferred one or more streams/sessions containing the identical content (e.g. for a live session) or from its local cache (e.g. on-demand content stored on the access nodes' local cache).

According to some other embodiments of the present invention, the multimedia routers may manipulate halted data streams so as to send the packets as tokenized packets to the border gateway. The tokenized packets may be the original packets received by the multimedia router in which some fields are manipulated by the multimedia router, or the tokenized packets may be the original packets received by the multimedia router along with an associated packet accompanying the original packet and containing a token. These tokenized packets may enable the border gateway to strip off the packet's content and only send substantially small size token packets to the access nodes. These token packets may enable the access nodes to reproduce the content either from other fully transferred one or more streams/sessions containing the identical content (e.g. for a live session) or from its local cache (e.g. on-demand content stored on the access nodes' local cache).

By having tokenized packets flow from the multimedia router to the border gateway, Lawful Interception and Charging/billing is enabled since the tokenized packets include the original packets. Only after the border gateway small token packets are sent to the access node.

According to some embodiments of the present invention, access nodes may be located substantially in proximity to the network's access point(s). Access nodes may inspect the content of some or all unicast streams/sessions and the corresponding ID information received from the multimedia routers or from the border gateway. Upon identification of an incoming unicast stream/session as being redundant (e.g. carrying identical content to that carried by a different stream/session received by this access node for live content, or carrying content stored on the local cache for on-demand content), the access node may send a dedicated management message to the respective multimedia router instructing it to halt that stream/session. Once the multimedia router has halted the stream/session, it may start sending only token packets to the respective access node, or tokenized packets to the border gateway which in turn may send only token packets to the respective access node, thus enabling the access node to locally regenerate the original content. After regenerating the genuine packets the access node may transfer them out to the relevant terminal. The access node may further support the insertion of personalized information, into regenerated packets, such as advertisements.

According to further embodiments of the present invention, the stream/session may be kept halted until the access node detects that the cause for halting no longer exists, due to one of several possible reasons (e.g. different [i.e. substituting] 'identical content carrying' stream/session has been halted; substitute content stored on the local access node's cache has been removed to make place for other, higher rated, content), after which a 're-stream/re-transmit management message' may be sent from the access node to its respective multimedia router, causing it to stream/the complete stream/session from that point on.

According to some embodiments of the present invention, in the event that an incoming unicast stream is recognized by an access node as an on-demand stream/content which is not locally stored on its local cache, the access node may utilize a decision algorithm to determine whether this content is to be stored locally. If the cache is full, the access node may use a content rating algorithm to decide what content should be removed from the cache in order to make place for the new one. Additionally (or alternatively), content may be downloaded to the access nodes' local cache in a push mode, for example, upon a release of content that is expected to have a high user demand.

Figure 2A:
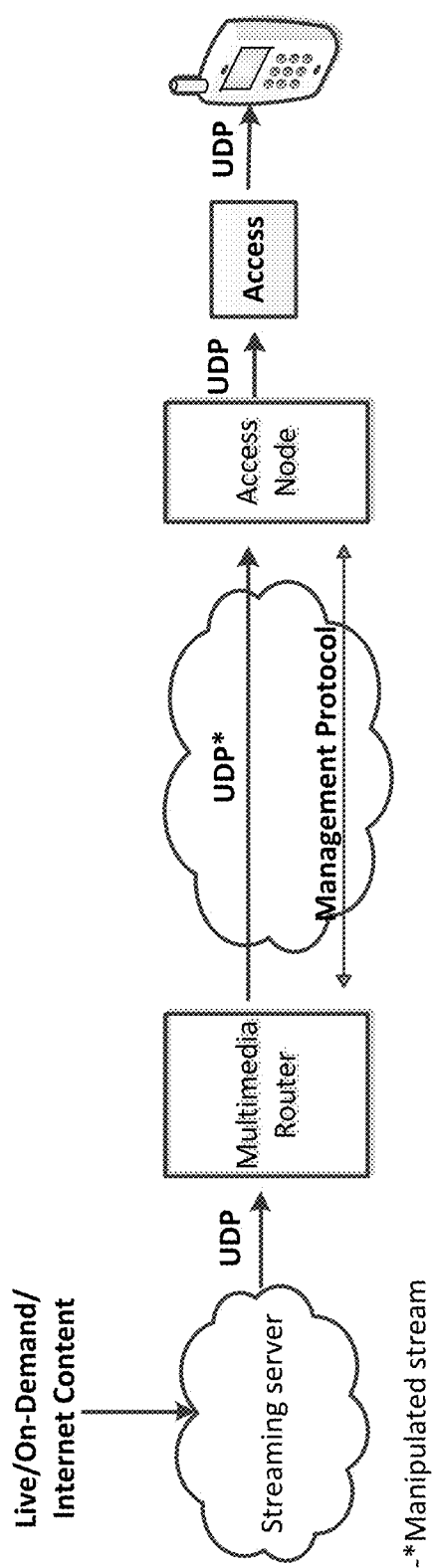
FIGS. 2A and 2B present examples of a multimedia router that accepts a UDP stream(2A)/TCP session(2B) from the Internet or from a streaming server, analyzes the content and transmits out modified traffic, in accordance with some embodiments of the present invention.
Figure 2B:
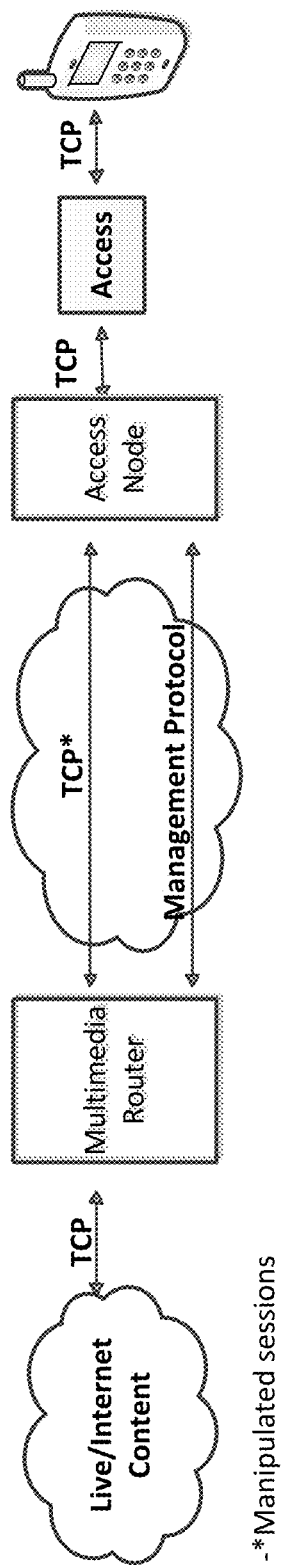

Reference is now made to FIGS. 2A and 2B, where, in accordance with some embodiments of the present invention, an example of a multimedia router that accepts a stream(2A)/session(2B) from the Internet or from a streaming server, analyzes the content and streams/transmits out UDP/TCP modified traffic. UDP/TCP traffic may be either untouched or implemented as minimal token packets including information that may be used by the access node to locally regenerate the original packets. These packets are encapsulated in any type of encapsulation and/or tunneling. The stream/content is received by the access node which analyzes it, handles it accordingly and streams the appropriate (regenerated or untouched) stream/content to the terminal.

Figure 3:
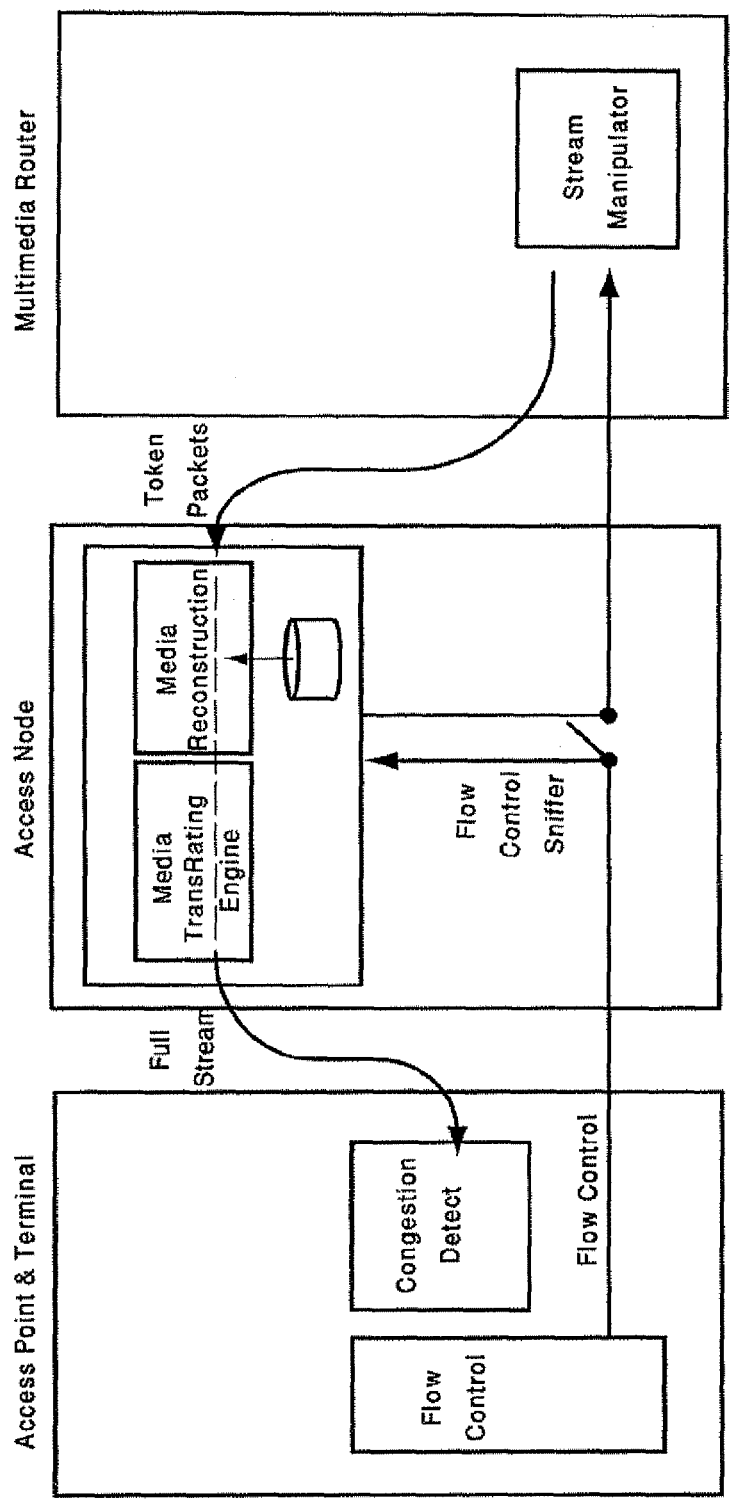
FIG. 3 presents an exemplary mechanism for optimizing traffic streaming, in accordance with some embodiments of the present invention.

Reference is now made to FIG. 3, where, in accordance with some embodiments of the present invention, an exemplary mechanism for optimizing traffic streaming according to information received from the lower layers of the network and introduced to the higher layers of the network is suggested. For networks in which flow control information is passed from the terminal/access through the network, this information may be used in higher layers of the transport, so as to adapt the transfer rate of the content to optimally match the network conditions.

According to some embodiments of the present invention, access nodes may probe flow control information sent from the terminals/access-points to the network. Based on the information gathered, the access nodes may be able to Trans-rate (i.e. change the rate of) any of the streams being sent towards that terminal, setting it at a substantially optimal rate, thus reducing packet-loss in the network. Furthermore, access nodes may run a 'smart scheduling mechanism' enabling them to control scheduling/policing decisions according to the specific application of each stream/session. According to other embodiments of the present invention, flow control information sent from the terminals/access-points to the network may be passed back to the multimedia routers' HTTP proxy servers, which may accordingly set the rate of the packets sent to the access nodes for that session to the appropriate rate which may reduce the number of packets lost in the network.

According to some embodiments of the present invention, the mechanism implemented in the access node may be adapted for sniffing of the flow control packets passed backwards from the terminal/access into the network, and controlling the bit-rate sent from the multimedia router to the terminal/access accordingly. This may be done using TransRating capabilities which may adjust the bit-rate of the content sent to the terminal/access so as to substantially match the actual current bit-rate the terminal is able to receive, in real-time, per stream.

According to further embodiments of the present invention, for content already available at the access node, only token packets generated by the multimedia router, or tokenized packets generated by the multimedia router substituted with token packets by the border gateway, may be sent to the access node, which may regenerate the full traffic from its local cache or from an additional live stream it is receiving, sending the packets out at the optimized bit rate. This capability may reduce the number of packets lost and may thus improve the end to end network utilization.

According to further embodiments of the present invention, a scheduling mechanism may be implemented within the access node, ensuring ongoing substantially-optimal fit between each stream and the overall network conditions. Each stream may be granted a weight according to relevant parameters (e.g. type of application, required bit-rate, required QOS) and the scheduling mechanism may serve each stream accordingly, taking into consideration the network capabilities towards the specific terminal receiving each stream.

According to some embodiments of the present invention, in order to ensure that redundant content (either already locally stored on the access node's local cache for on-demand content or being streamed on a different stream to the access node for live content) isn't fully streamed from the multimedia router to the access node, a protocol of management messages may run between the multimedia router and the access node, controlling the actual streams.

The following section of the present invention's description provides examples of some of the communication flows practiced by it. It will, however, be clear to one of ordinary skill in the art that various specific communication details may change and that these are merely general examples of some of the possible embodiments of the present invention.

Reference is now made to FIGS. $4A_1$, $4A_2$ and $4B_1$, $4B_2$, where, in accordance with some embodiments of the present invention, an illustration of exemplary communication flows in which the multimedia router and the access node communicate to halt and resume streams($4A_1$, $4A_2$)/sessions ($4B_1$, $4B_2$) between themselves for live content. Reference is now made to FIGS. $4C_1$, $4C_2$ and $4D_1$, $4D_2$, where, in accordance with some embodiments of the present invention, an illustration of exemplary communication flows in which the multimedia router and the access node communicate to halt and resume streams($4C_1$, $4C_2$)/sessions($4D_1$, $4D_2$) between themselves for live content. According to this exemplary communication flow, Lawful Interception and Charging/billing is enabled due to the border gateway which receives tokenized packets from the multimedia router and turns them into token packets. Reference is now made to FIGS. 5A and $5B_1$, $5B_2$, where, in accordance with some embodiments of the present invention, illustrations of exemplary communication flows in which the multimedia router and the access node communicate to halt and resume streams(5A)/sessions($5B_1$, $5B_2$) between themselves for on-demand content. Reference is now made to FIGS. 5C and $5D_1$, $5D_2$, where, in accordance with some embodiments of the present invention, illustrations of exemplary communication flows in which the multimedia router and the access node communicate to halt and resume streams(5C)/sessions ($5D_1$, $5D_2$) between themselves for on-demand content. According to this exemplary communication flow, Lawful Interception and Charging/billing is enabled due to the border gateway which receives tokenized packets from the multimedia router and turns them into token packets.

According to some embodiments of the present invention, multimedia routers and access nodes may route data streams to the current access point (e.g. cell) in which their targeted terminal(s) is located and/or enable a hand-off between cells, in networks supporting nomadic terminals (e.g. Mobile Cellular, Wimax).

According to some embodiments of the present invention, in networks supporting nomadic behavior of the terminals (e.g. mobile cellular networks, WiMax networks) the system may support the detection and handover of streamed data between cells, thus the terminals may continue to receive continuous unaffected data steams/contents regardless of their current position within the network. Reference is now made to FIGS. 6A and 6B, where, in accordance with some embodiments of the present invention, illustrations of exemplary communication flows and control messages which may be sent between the multimedia router and the respective access nodes, over a unmanaged network (6A) or a controlled traffic transmission network (6B), so as to ensure continuous undisturbed data streaming between the streaming-server/Internet and the terminals. Reference is now made to FIGS. 6C and 6D, where, in accordance with some embodiments of the present invention, illustrations of exemplary communication flows and control messages which may be sent between the multimedia router and the respective access nodes, over a unmanaged network (6C) or a controlled traffic transmission network (6D), so as to ensure continuous undisturbed data streaming between the streaming-server/Internet and the terminals. According to this exemplary communication flow, Lawful Interception and Charging/billing is enabled due to the border gateway which receives tokenized packets from the multimedia router and turns them into token packets. According to further embodiments of the present invention, information which is stored within the network relating to the location of the terminals in the network and the way the network is forwarding traffic from the center to its terminals may be used in this process. According to further embodiments of the present invention, a "handshake" solution, substantially similar to the one utilized between the multimedia router and the access nodes, may also take place when performing a handoff from an end point including a access node to one not including an access node and vice versa.

According to some embodiments of the present invention, the system may be integrated into/as-part-of a mobile cellular network. Reference is now made to FIG. 7 where an exemplary integration of the present invention into a mobile cellular network is shown. The main modules of the system may be located in the core network, the multimedia router between the service and Internet domains and the Gateway General Support Node (GGSN), and the access nodes in Radio Access Network (RAN) adjacent to the Node-B elements and/or in the vicinity of the aggregation points on the other side. Reference is now made to FIG. 7A where an exemplary integration of the present invention into a mobile cellular network is shown. The main modules of the system may be located in the core network, the multimedia router between the service and Internet domains and the Gateway General Support Node (GGSN), the border gateway between the Serving GPRS Support Node (SGSN) and the Radio Network Controller (RNC) for 3G or between the P-GW and S-GW or between the S-GW and the security gateway for LTE, and the access nodes in Radio Access Network (RAN) adjacent to the Node-B elements and/or in the vicinity of the aggregation points on the other side.

Reference is now made to FIG. 8, where, in accordance with some embodiments of the present invention, an exemplary cross layer optimization mechanism for mobile wireless networks is shown. In this specific implementation of the mechanism the access node may include sniffing of the flow control packets passed backwards from Node-B, and controlling the bit-rate sent from the Radio Network Controller (RNC) towards the Node-B accordingly. This may be done using TransRating capabilities which may adjust the bit-rate of the content sent to Node-B, substantially to the actual current bit-rate that the RF link is able to receive, in real-time, per stream.

According to further embodiments of the present invention, for content already available at the access node, only tokens may be sent, possibly at a constant bit rate (according to the defined streaming rate) to RNC and on to the access node, which may regenerate the full traffic from the local cache and/or form an additional live stream it is receiving, sending the packets out at substantially the optimized bit rate. This capability may reduce the number of lost packets in the network, thus improving the end to end network utilization, including the RF link itself. According to some embodiments, the tokens may be generated by the multimedia router. According to other embodiments, the tokens may be generated by the border gateway which may substitute a corresponding token for each tokenized packet it may receive from the multimedia router.

According to some embodiments of the present invention, the system may be integrated into/as-part-of a mobile Wimax network. Reference is now made to FIG. 9 where an exemplary integration of the present invention into a mobile Wimax network is shown. The main modules of the system may be located in the Connectivity Service Network (CSN), the multimedia router between the service and Internet domains and the Access Service Network Gateway (ASN-GW), and the access nodes in the Access Service Network (ASN) substantially adjacent to the Base Station (BS) elements and/or in the vicinity of the aggregation points on the other side. In some cases in which the ASN-GW is located within the BS, the modules which are usually adjacent to the BS may be placed adjacent to the ASN-GW itself. Reference is now made to FIG. 9A where an exemplary integration of the present invention into a mobile Wimax network is shown. The main modules of the system may be located in the Connectivity Service Network (CSN), the multimedia router between the service and Internet domains and the Access Service Network Gateway (ASN-GW), the border gateway between the Mobile IP Home Agent (MIP-HA) and the access nodes in the Access Service Network (ASN) substantially adjacent to the Base Station (BS) elements and/or in the vicinity of the aggregation points on the other side. In some cases in which the ASN-GW is located within the BS, the modules which are usually adjacent to the BS may be placed adjacent to the ASN-GW itself.

Reference is now made to FIG. 10, where, in accordance with some embodiments of the present invention, an exemplary cross layer optimization mechanism for mobile Wimax networks is shown. This specific implementation of the mechanism may be substantially similar to the above described implementation in mobile cellular networks.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A communication network adapted to deliver content to a mobile communication device communicatively coupled to an access node of the communication network, said network comprising:
    a gateway between said communication network and one or more content sources;
    a multimedia router functionally associated with said gateway and including communication circuitry to route streams of content from the one or more content sources to mobile communication devices, through access points of said communication network;

a border gateway functionally associated with said multimedia router and adapted to: (1) identify redundant data packets being streamed to a given access node, wherein a redundant data packet is a data packet containing content identical to content contained in a different data stream or identical to content stored in a cache of the communication network, (2) replace redundant data packets with token packets, representing the redundant packets without containing the identical content; and (3) stream the token packets to the given access node in place of the redundant packets; and access nodes functionally associated with stream generating circuitry adapted to regenerate an original stream of content from token packets using data from a local cache or a different stream.

2. The network according to claim 1, wherein said given access node is a wireless access node.

3. The network according to claim 2, wherein said network is a cellular network.

4. The network according to claim 2, wherein said given access node is a WiFi access node.

5. The network according to claim 1, further comprising access nodes functionally associated with stream generating circuitry adapted to regenerate an original stream of content from token packets using data from a local cache or a different stream.

6. The network according to claim 1, wherein said cache is located at or near the given access node.

7. The network according to claim 1, wherein said stream generating circuitry is further adapted to insert into the regenerated stream content specific to an intended recipient of the regenerated stream.

8. The network according to claim 7, wherein said stream generating circuitry is further adapted to insert into the regenerated stream non-cached content received from the gateway.

9. The network according to claim 7, wherein content specific to an intended recipient of the regenerated stream is an advertisement.

10. A communication system for delivering content to mobile communication devices communicatively coupled to access nodes of a communication network, said system comprising:

a border gateway adapted to be coupled to a gateway of the communication network and comprising signal processing circuitry adapted to:
(i) identify redundant data packets being streamed through the gateway to a given access node of the communication network, wherein a redundant data packet is a data packet containing content identical to content contained in a different data stream or identical to content stored in a cache functionally associated with the given access node;
(ii) replace the redundant data packets with token packets representing the redundant packets without containing the identical content; and
(iii) stream the token packets to the given access node in place of the redundant packets; and stream generating circuitry to be functionally associated with the given access node and adapted to regenerate an original stream of content from the token packets, using data from a local cache or a different stream arriving at the given access node.

11. The system according to claim 10, wherein the network is a cellular network.

12. The system according to claim 10, wherein the given access node is a WiFi access node.

13. The system according to claim 10, wherein the cache is located at or near the given access node.

14. The system according to claim 10, wherein said stream generating circuitry is further adapted to insert into the regenerated stream content specific to an intended recipient of the regenerated stream.

15. The system according to claim 14, wherein content specific to an intended recipient of the regenerated stream is an advertisement.

16. The system according to claim 10, wherein said stream generating circuitry is further adapted to insert into the regenerated stream non-cached content received from the gateway.

17. A communication method for delivering content to mobile communication devices communicatively coupled to access nodes of a communication network, said method comprising:

identifying, by a gateway device coupled to a gateway of the communication network, a data stream of one or more redundant data packets being streamed through the gateway to a given access node of the communication network, wherein the one or more redundant data packets are data packets containing content identical to content which is contained in a different data stream or content which is identical to content stored in a cache functionally associated with the given access node;

replacing, by the gateway device, the redundant data packets with token packets, representing the redundant packets without containing the identical content;

streaming the token packets to the given access node in place of the redundant packets and regenerating from the token packets, using processing circuitry functionally associated with the given access node, an original stream of content, using data from a local cache or a different stream arriving at the given access node.

18. The method according to claim 17, further comprising inserting into the regenerated stream content specific to an intended recipient of the regenerated stream.

* * * * *